United States Patent [19]
Yeager et al.

[11] Patent Number: 5,950,190
[45] Date of Patent: Sep. 7, 1999

[54] DYNAMIC, SELF-MODIFYING GRAPHICAL USER INTERFACE FOR RELATIONAL DATABASE APPLICATIONS

[75] Inventors: Carolyn Marie Yeager; Jerry Lynn Udy, both of Colorado Springs, Colo.

[73] Assignee: Aptek, Inc., Colorado Springs, Colo.

[21] Appl. No.: 08/854,928

[22] Filed: May 13, 1997

[51] Int. Cl.⁶ ........................................ G06F 17/30
[52] U.S. Cl. ..................... 707/3; 707/511; 707/103
[58] Field of Search ................................. 707/4

[56] References Cited

U.S. PATENT DOCUMENTS

| | | | |
|---|---|---|---|
| 5,428,737 | 6/1995 | Li et al. ........................ | 707/4 |
| 5,428,776 | 6/1995 | Rothfield ...................... | 707/4 |
| 5,555,403 | 9/1996 | Cambot et al. ............... | 707/4 |
| 5,732,274 | 3/1998 | O'Neill ......................... | 395/705 |
| 5,745,896 | 4/1998 | Vijaykumar .................. | 707/100 |
| 5,749,079 | 5/1998 | Yong et al. ................... | 707/100 |
| 5,832,481 | 11/1998 | Sheffield ...................... | 707/4 |
| 5,893,125 | 4/1999 | Shostak ........................ | 707/511 |
| 5,899,997 | 5/1999 | Ellacott ........................ | 707/103 |

OTHER PUBLICATIONS

Chapter 12, "Implementing Dynamic SQL Method 4", from Oracle Programmers Guide, Release 2.1; Mar. 1995; Part No. A21020–2.

*Primary Examiner*—Wayne Amsbury
*Attorney, Agent, or Firm*—John R. Ley

[57] ABSTRACT

A dynamic database interface for relational and object-oriented databases includes a dynamic, self-modifying graphical user interface defining a plurality of graphical windows for searching and editing the contents of the relational database, as well as modifying the structure of the database tables. The graphical user interface recognizes modifications to the structure of the database tables and regenerates the graphical windows to accommodate such modifications. The graphical windows also depict schematic representations of physical locations of objects stored within the tables of the relational database. In addition to using the graphical windows to edit the contents and modify the structure of the relational database, batches of data may be imported to both edit the contents of the relational database and modify the structure of the relational database tables.

26 Claims, 19 Drawing Sheets

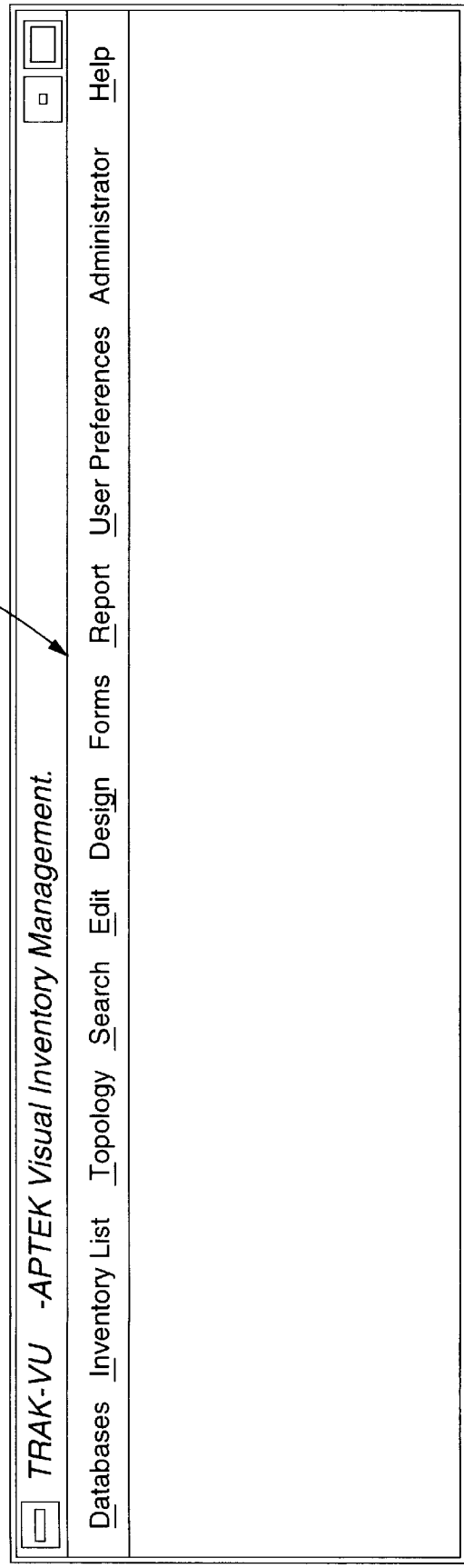

FIG. 6

Search Results for Inventory Object

File  Color  Fonts  Size    Help

[Sort]  [View] — 74    [Copy to Edit Window] — 76

627 Record(s) Found — 72

| Barcode | Partno | Description |
|---------|--------|-------------|
| 328 | PICTURETEL-CAMERA | VC, PICTURETEL CAMERA |
| 340 | PICTURETEL-CAMERA | VC, PICTURETEL CAMERA |
| 561 | HITACHI-RU-C10 | REMOTE CONTROL CAMERA |
| 562 | HITACHI-RU-C10 | REMOTE CONTROL CAMERA |
| 563 | HITACHI-RU-C10 | REMOTE CONTROL CAMERA |
| 564 | HITACHI-RU-C10 | REMOTE CONTROL CAMERA |
| 565 | ELMO-EV-368 | GRAPHICS CAMERA |
| 568 | VICON-7100R | CAMERA CONTROL UNIT |
| 569 | VICON-7100R | CAMERA CONTROL UNIT |
| 570 | VICON-7100R | CAMERA CONTROL UNIT |
| 1233 | FUJI-FUJIX-DS-220 | DIGITAL CARD CAMERA |
| 1234 | FUJI-FUJIX-DS-220 | DIGITAL CARD CAMERA |
| 1237 | JVC-GR-DV1 | DIGITAL CARD CAMERA |
| 1239 | KODAK-DC50 | DIGITAL CARD CAMERA |
| 1342 | CANON-EOS-ELAN | 35MM CAMERA |
| 1343 | CANON--380EX | 35MM CAMERA FLASH |

Name of Query Used for Search:

— 70

DYNAMIC, SELF-MODIFYING GRAPHICAL USER INTERFACE FOR RELATIONAL DATABASE APPLICATIONS

This invention was made with U.S. Government support under SBIR contract NAS9-19528 awarded by the National Aeronautics and Space Administration. The U.S. Government has certain rights in the invention.

FIELD OF THE INVENTION

This invention relates generally to relational database management systems ("RDBMS") used to store data in a plurality of tables and retrieve that data by virtue of relationships established between the data tables. More particularly, the present invention relates to a new and improved graphical interface which allows an end user to query and edit the contents of the RDBMS as well as alter the design or structure of the underlying relational database.

BACKGROUND OF THE INVENTION

Relational database technology represents an advancement over early data tables due to the relationships established between the data tables during the storage and retrieval processes. These relationships allow the data stored within the relational database to be logically searched and manipulated by the RDBMS.

An end user typically interacts with a RDBMS (e.g., an Oracle™ database) through the use of structured query language ("SQL") statements which logically define the parameters of the search query. However, for an end user to accurately query a relational database using SQL statements, the end user must have a working knowledge of the particular structured query language that is used with the relational database and must also be intimately familiar with the structure of the particular relational database itself. Unfortunately, the end user's task is complicated by the fact that structured query languages are widely perceived to be complex languages which are difficult for end users to comprehend and use efficiently.

To shield end users from the complexities of SQL, many RDBMSs utilize predefined queries which end users may access and apply to the underlying relational database through the use of a menu system. Alternatively, more recent relational database management systems have employed a graphical user interface ("GUI") to allow end users to formulate queries in a manner which does not require any knowledge of SQL. For example, U.S. Pat. No. 5,428,737, issued to Li et al. for a process of COMPREHENSIVE BILATERAL TRANSLATION BETWEEN SQL AND GRAPHICALLY DEPICTED QUERIES, describes a method and system for translating back and forth between SQL statements and graphical format queries. Such translation allows end users to formulate new database queries in the graphical domain with no prior knowledge of SQL. Additionally, due to the bilateral nature of the translation, end users may also import previously constructed SQL queries and modify those queries in the graphical domain.

U.S. Pat. No. 5,555,403, issued to Cambot et al. for a RELATIONAL DATABASE ACCESS SYSTEM USING SEMANTICALLY DYNAMIC OBJECTS, also describes a system for allowing end users to query a relational database without knowing either the relational structure of the database or any particular structured query language. The system appears to use a graphical user interface which allows end users to define database queries using familiar graphical elements (e.g., multiple windows and a "point and click" interface). The system then translates the graphical query into a SQL statement that the underlying relational database can understand. Once the relational database executes the translated query, the GUI displays the results of the query in a tabular format.

As represented in the above-described references, the integration of a RDBMS with a GUI can greatly enhance or facilitate the ease with which the contents of a relational database can be searched or modified. In particular, end users having little or no experience with relational databases or structured query languages can utilize the GUI to perform complex database queries or to edit the contents of the relational database.

However, the integration of a GUI with an underlying relational database as described in the above patent references is typically accomplished by a software programmer who is completely familiar with both the structure of the relational database as well as the particular SQL used to interface with the database. The programmer thus constructs a static (i.e., hard-coded) GUI based on the existing structure (i.e., the specific tables and columns) of the relational database.

Typically, for each different database application, a customized GUI must be specifically constructed or tailored to meet the unique requirements for the type of data contained within the relational database as well as the manner in which the data is displayed to the end user. Therefore, a single standardized GUI will not typically suffice for a number of different relational databases, and a new customized interface must generally be created for each new database application. Additionally, many existing database applications will evolve over time and thus require changes to the underlying database structure. However, for each modification to the structure of an existing relational database (e.g., adding one or more columns to the database or modifying the attributes of existing columns), corresponding coding changes to the customized GUI will generally be required. Modifications to the database structure and GUI usually require the expertise of a database administrator and a software developer and thus can be time consuming and costly, particularly where the relational database serves as an inventory management tool for a dynamic, growing environment such as the International Space Station ("ISS") or in any other commercial applications which exhibit parallels to the ISS.

A relational database is well suited to managing the inventory of the ISS where thousands of items must be efficiently stowed in a limited amount of space. The inventory items must be constantly tracked as new items are transported to the ISS and used or worn items are returned to earth. A customized GUI is essential to allow the astronauts of different nationalities to interface with (e.g., query or update) the relational database since it is unlikely that the astronauts will be fluent in structured query languages. However, the ISS will be built in stages over the course of several years so that the definition of the station (and therefore the definition of the inventory management system itself) will be continuously modified over time. Due to the dynamic environment of the ISS, existing relational databases and their corresponding static GUIs will be unable to adapt to the fluctuating definition of the inventory management system.

Because astronauts will inhabit and conduct scientific research on the ISS prior to its complete construction, there is a need for an integrated relational database inventory management system and a customized GUI which will provide astronauts a simple way to track the inventory of the station. The GUI should allow the astronauts to efficiently query the database as well as modify the contents of the database without requiring a knowledge of structured query languages. Additionally, because the environment of the ISS will evolve over time, the GUI should allow the astronauts to alter the definition or the structure of the inventory management system (i.e., the relational database) without requiring any special software programming skills on the part of the astronauts. However, currently available relational database management systems and their corresponding graphical interfaces do not currently provide such a self-modifying ability. Rather, skilled database managers and software developers must alter the code of both the relational database and the GUI whenever the definition of the relational database is altered. The drawbacks of such systems are obvious where the relational database is used on board an orbiting space station populated by multi-national astronauts having little or no experience with either relational databases or structured query languages.

It is with respect to these and other background considerations, limitations and problems, that the technique of the present invention has evolved.

SUMMARY OF THE INVENTION

A dynamic database interface of the present invention offers significant advantages and improvements which achieve a true dynamic, self-modifying graphical user interface for use with relational or object-oriented database management systems. The dynamic database interface allows users to search and edit the contents of a relational database as well as modify the structure of the relational database tables. The dynamic database interface further provides for the import and export of batches of data to and from the relational database, respectively. Additionally, when the contents of the relational database include physical objects (e.g., inventory items) having specific storage locations associated therewith, the dynamic database interface of the present invention further provides schematic representations of the physical locations of the relational database contents.

In accordance with these general aspects, the dynamic database interface of the present invention is executed by programmed instructions of a general purpose computer in response to input information. The general purpose computer includes a memory in which the programmed instructions are recorded, an input device to supply input information for interaction with the programmed instructions, and a display device for displaying information created by the programmed instructions and the input information. The functions achieved by the programmed instructions involve creating a dynamic, self-modifying graphical user interface for a relational database. The dynamic graphical user interface allows a user to search and edit the contents of the relational database using a plurality of graphical windows generated by the graphical user interface. Additionally, the graphical user interface also utilizes graphical windows to allow a user to edit the structure or data dictionary of the relational database without requiring the use of a structured query language. Furthermore, the dynamic graphical user interface of the present invention modifies and regenerates the graphical windows each time the data dictionary is changed so that the graphical windows accurately reflect the current structure of the relational database. If the contents of the relational database include objects stored within a defined physical environment, the dynamic graphical user interface also generates graphical windows which display schematic representations of the physical locations of each of the inventory objects. Lastly, the dynamic database interface of the present invention further provides for the import of batches of data to the relational database to both edit the contents of the relational database and modify the structure or data dictionary of the relational database. Upon each modification to the data dictionary, the dynamic graphical user interface regenerates each of the different graphical windows to incorporate any changes to the structure of the relational database tables.

One of the significant aspects of the present invention pertains to a new dynamic graphical user interface for use with relational databases which allows database users to search and edit the contents of the database without requiring the users to be familiar with relatively complex structured query languages. Due to the dynamic nature of the graphical user interface, the users will be able to continue to use the graphical user interface even after modifications have been made to the structure or the data dictionary of the relational database.

A further significant aspect of the present invention relates to a dynamic graphical user interface which allows database users to modify the structure or data dictionary of the relational database without the use of a structured query language. Because the dynamic graphical user interface recognizes changes to the data dictionary and modifies itself to incorporate those changes, modifications to the structure of the relational database will not render the graphical user interface of the present invention inoperative.

In accordance with these improved aspects of the present invention, the dynamic graphical user interface may be used with relational or object-oriented databases in dynamic environments where both the contents as well as the structure of the database are frequently modified. Such dynamic database environments would present severe challenges to static graphical user interfaces because the graphical windows generated by such static interfaces would require modifications (i.e., programming code updates) to accommodate each change to the database structure. Such modifications would typically only be performed by a software programmer experienced with both relational database languages such as SQL and the design of graphical user interfaces. Thus, the interface of the present invention provides inexperienced and experienced users alike the ability to modify both the contents and structure of a relational database without requiring the intervention of skilled software programmers and database administrators.

A more complete appreciation of these and other significant aspects of the present invention and its scope may be obtained from the accompanying drawings, which are briefly summarized below, from the following glossary of terms used to describe this invention, from the following detailed description of a presently preferred embodiment of the invention, and from the appended claims.

DETAILED DESCRIPTION OF THE DRAWINGS

FIG. 3 is an illustration of an exemplary screen display of a dynamic graphical user interface main window and menu bar according to the present invention, which appears on a display device of the representative computer system shown in FIG. 2.

FIG. 6 is an illustration similar to the screen display shown in FIG. 3, in which a search results window displays the results of a search conducted via the search window shown in FIG. 4.

Figure 1:
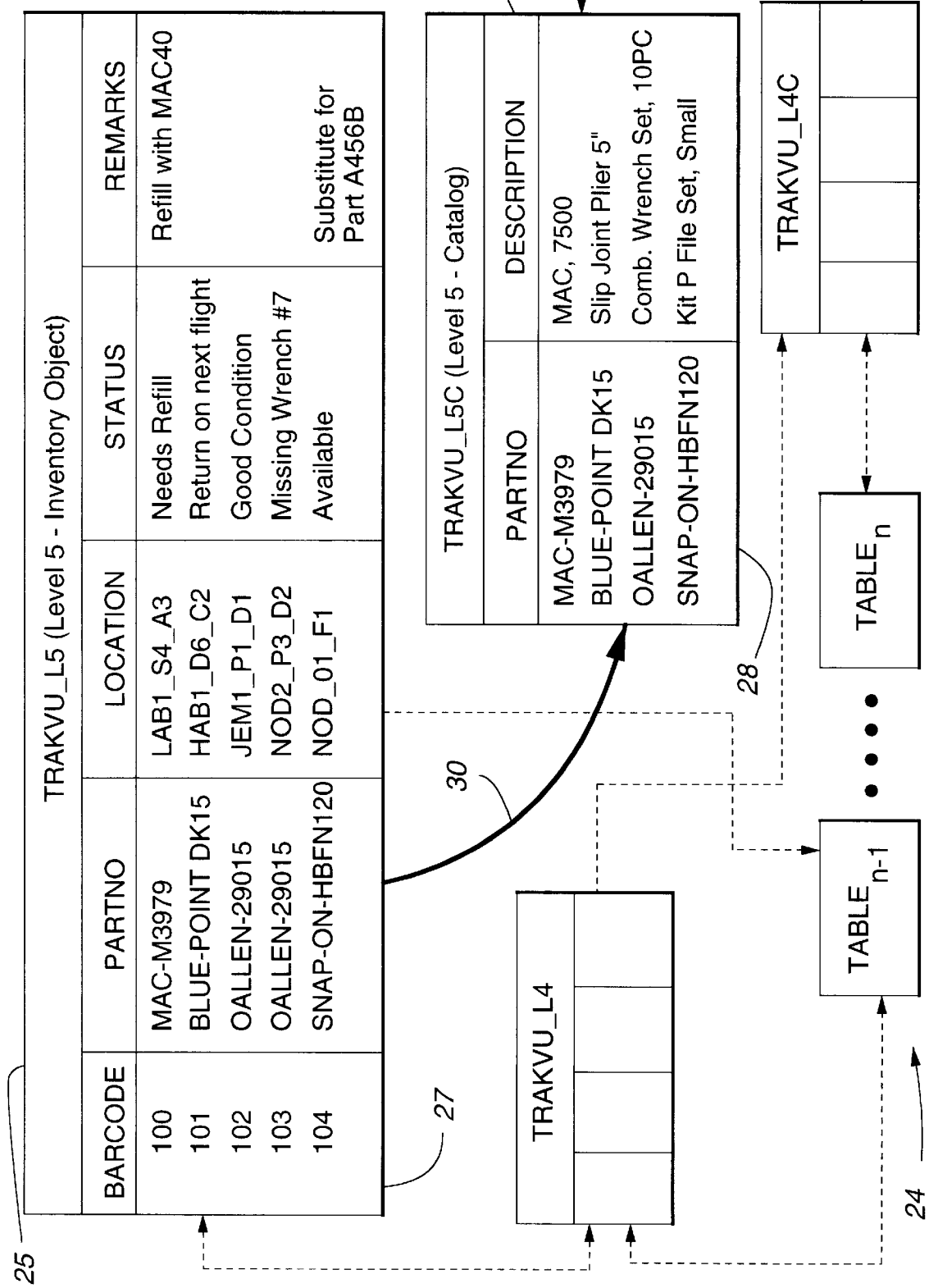
FIG. 1 is a representation of a sample relational database illustrating a plurality of tables and relations between columns of those tables, including a partial listing of the contents of the tables TRAKVU_L5 and TRAKVU_L5C containing inventory items for the ISS.

The terms "TRAK-VU" and "Aptek" appear in some of the drawings. These terms are a trademark and trade name of the assignor, respectively.

Glossary and Acronyms

As a convenience in describing the invention herein, the following glossary of terms is provided. Because of the introductory and summary nature of this glossary, these terms must also be interpreted more precisely by the context of the Detailed Description in which they are discussed.

"Constraints" are indicators which describe the type of data stored in each column and of a table and the relationship between the data stored in that column and data stored in other tables.

"Cursor" is a pointer to a memory location associated with a specific SQL statement.

"Data Dictionary" is a data structure containing a listing of all the tables within a relational database and the relations between individual columns of those tables.

"GUI" means graphical user interface.

"ISS" means the International Space Station.

"Join" means the display of related columns or rows in multiple tables.

"Parsing" is a step in the processing of a SQL statement. Parsing checks the SQL statement for syntactic and semantic validity and determines whether the process issuing the statement has privileges to execute it.

"Primary Key Constraint" means a constraint which identifies a column as the primary key (i.e., the primary parameter) which contains unique data for each row of the table and thus serves as the anchor for all the other relational data within the table(s).

"RDBMS" means relational database management system.

"Referential Integrity Constraint" means a constraint which defines a relation between two tables in a relational database via a common column in each table.

"Relational database" is a database in which all the data is organized in a collection of tables with relationships defined between the separate tables to allow the data to be stored and searched in an efficient manner.

"SQL" means structured query language.

"Table" is an orderly arrangement of data in columns and rows.

Detailed Description of the Preferred Embodiment

A presently preferred embodiment of the dynamic graphical user interface of the present invention is described in the context of a RDBMS such as the Oracle™ 7 database available from Oracle Corporation. A relational database includes a number of tables (each identified by a table name) which contain all of the user-accessible data. A brief description of relational databases and their terminology is provided below so that the novel features of the present invention may be more easily understood.

Databases typically store information in one or more tables where the columns of the tables define a structure of the database and the rows of the tables contain the different objects or items of information stored within the database (i.e., the database contents). Relational databases operate by storing information in a number of different tables and then defining relations between those tables and their columns. Thus, relational databases are known to operate relatively efficiently since they eliminate the wasteful storage of duplicate information which would otherwise occur if only a single large table were utilized.

FIG. 1 illustrates a sample relational database 24 used to illustrate aspects of the present invention. As discussed above, and for the purposes of illustrating the dynamic graphical user interface of the present invention, the sample relational database 24 preferably contains data tables for the management of inventory on board the ISS.

Although the relational database 24 includes a plurality (n) of tables, partial listings of two tables 25 and 26 are shown in FIG. 1. Table 25 includes a number of columns (only five columns are shown in FIG. 1) which describe different parameters (e.g., BARCODE, PARTNO, LOCATION, STATUS and REMARKS) of the inventory objects stored on board the ISS. Table 26 includes a number of columns (only two columns are shown in FIG. 1) which describe additional parameters (e.g., DESCRIPTION) of the inventory (PARTNO) objects in table 25.

When multiple identical inventory items (i.e., items with the same PARTNO in table 25) are stored on board the ISS, these identical items will have many of the same parameters (e.g., the same DESCRIPTION) even though these identical items may be stored in different locations on board the ISS or may be assigned different bar codes and statuses (see, for example, the entries associated with bar codes 102 and 103 in table 25). Thus, these common additional parameters are more efficiently stored within a separate table (e.g., table 26) which is then linked or related in the typical manner of a relational database to table 25 through the PARTNO parameter.

In relational database terminology, each table contains a primary key parameter or column which contains a unique value for each row of data within the table. For example, column 27 (BARCODE) represents the primary key parameter for the table 25 shown in FIG. 1 since a unique bar code number is assigned to each inventory item stored within that table. Similarly, column 28 (PARTNO) represents the primary key parameter for the table 26 shown in FIG. 1 since each unique part number is associated with a different description (along with other parameters such as purpose, vendor, cost, etc., not shown in FIG. 1). Thus, all of the information in table 26 may be linked or related to the inventory items in table 25 by defining a relation between the PARTNO column in table 25 and the primary key parameter (the PARTNO column) in table 26. A link 30 between the PARTNO columns of these two tables is illustrated by a solid arrow in FIG. 1. This link or relation is generally known as a referential integrity constraint which allows multiple tables to be joined and their parameters queried together, as described in greater detail below. A number of additional relations between tables are generally indicated by the dashed lines and arrows in FIG. 1.

Thus, as referred to below, the table rows contain the contents of a relational database (e.g., the inventory items shown in the relational database 24 in FIG. 1) while the columns of the tables define the structure of a relational database. To allow the contents of a relational database to be edited separately from the structure or interrelations of the database tables, a RDBMS (e.g., Oracle™ 7) typically stores the definitions of the table structures (i.e., the table names and columns), as well as the different relations and constraints defined between the tables, in a data structure which is generally known as a "data dictionary." The data dictionary may be visualized as a listing of all the tables within a relational database and the relations between those tables and their individual columns (similar to that shown in FIG. 1). Thus, the data dictionary for the relational database 24 must be defined before any information may be input into the database.

Prior graphical user interfaces which have been utilized with relational databases have allowed end users to edit the contents of the database but not its structure (i.e., not its data dictionary). Instead, database managers would typically be required to edit the data dictionary through the use of relatively cumbersome SQL commands. Additionally, once changes were made to the data dictionary, the prior art graphical user interface would typically need to be revised by a software programmer to reflect the changes to the data dictionary. However, the dynamic graphical user interface of the present invention allows users to edit the contents as well as the structure or data dictionary of the relational database 24 without requiring the use of SQL commands. Furthermore, the dynamic interface of the present invention also modifies itself (i.e., its different windows or screen displays) to account for changes to the data dictionary of the underlying relational database 24.

Figure 2:
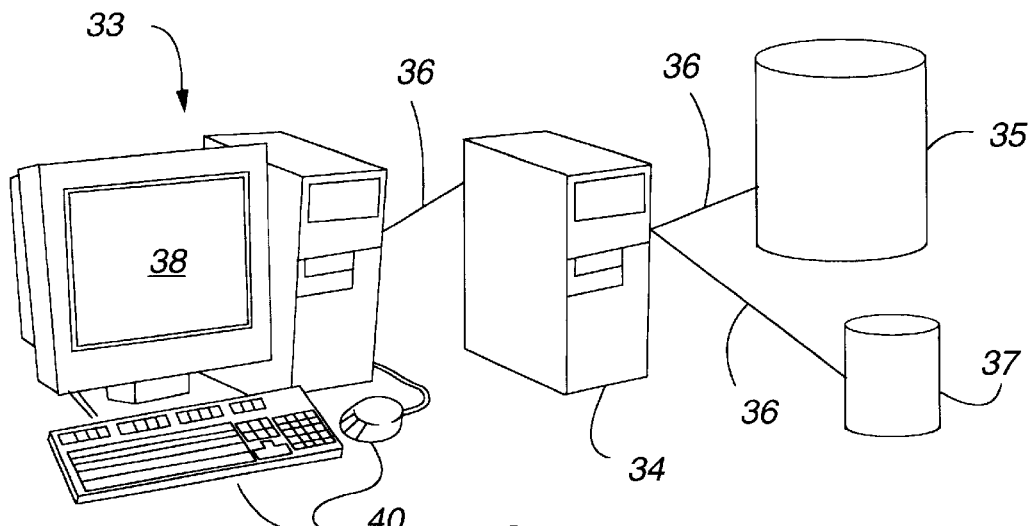
FIG. 2 is a schematic depiction of a representative computer system which is controlled by instructional code of the present invention.

A representative conventional hardware environment for implementing the present invention is illustrated in FIG. 2, including a workstation 33, a server 34 and a nonvolatile storage medium such as a hard disk 35 for storing the information defining the relational database 24. The workstation 33 and the hard disk 35 preferably communicate with the server 34 via a network 36. Alternatively, the hard disk 35 may also be connected internally to the server 34 or other computer component. Additionally, other workstations (not shown) may also be attached to the server 34 via the network 36.

The server 34 also preferably contains the information defining the data dictionary which, as noted above, defines the database structure and relations between the tables of the relational database 24. The data dictionary is preferably stored in nonvolatile memory or on a storage medium such as a hard disk 37, and is preferably connected internally to the server 34 (although it is shown connected via the network 36 for clarity in FIG. 2).

The workstation 33 includes a display device 38 as well as one or more input devices 40 (e.g., a keyboard and a mouse). Other input devices (not shown) may include a bar code reader, a trackball, a touch pad, etc. Alternatively, the display device 38 may include a touch screen and thus may also function as an input device 40. In non-networked applications, the functions of the workstation 33 and the server 34 can be combined in a single computer.

The workstation 33 also preferably includes nonvolatile memory which contains the programmed instructions for the dynamic graphical user interface of the present invention, as well as a conventional processor for executing those programmed instructions. As noted above, the dynamic graphical user interface of the present invention preferably allows relatively inexperienced users to interface with the relational database 24 without requiring knowledge of a relational database language such as SQL. The dynamic interface also recognizes modifications to the structure or data dictionary of the relational database 24 and, in turn, modifies itself to accommodate those changes. Both of these functions are discussed in greater detail below.

Operation of the Dynamic Graphical User Interface

To better understand the operation of the present invention with the preferred example of the ISS inventory database (as shown in FIGS. 3–12), a brief explanation of the layout of the ISS and the inventory storage areas available on board the ISS is provided. The storage space (referred to hereinafter as "container spaces") on board the ISS is arranged in a hierarchical manner with a number of smaller container spaces being located within each larger container space (e.g., a number of trays are located in a rack and a number of racks are located within each space station module, etc.). The container space hierarchy on board the ISS is preferably broken into five different levels, as explained below.

The current design of the ISS provides for a number of different modules (see FIG. 9) including an Italian Pressurized Logistics Module (IPLM), a Japanese Experimental Module (JEM), a U.S. Laboratory (LAB), a U.S. Habitation modules (HAB), and connecting nodes between the different modules (NOD1 and NOD2). Each cylindrical module of the ISS includes four walls designated as "overhead," "starboard," "deck," and "port." Each of these four walls preferably includes a number of equipment racks (see FIG. 10), and each equipment rack preferably includes two columns of trays (see FIG. 11) which hold the inventory items. Therefore, with respect to the preferred example of the ISS, the relational database 24 defines five organizational levels as follows: Level 1 representing the overall space station; Level 2 representing the different modules of the space station; Level 3 representing the different racks within each module, Level 4 representing the different trays within each rack; and Level 5 representing the individual inventory objects contained within each tray. Of course, more or fewer levels may be established for other inventory environments.

Thus, for example, the tables 25 and 26 shown in FIG. 1 which contain information regarding the individual inventory items themselves (as opposed to the information regarding the trays, the racks, the modules, etc.) are referred to as "Level 5" tables. These tables will be described in greater detail below.

The dynamic graphical user interface ("DGUI") of the present invention preferably utilizes a multi-window environment, with a main or start-up window 44 shown in FIG. 3. The main window 44 includes a menu bar 46 which provides users access to all of the features of the DGUI, including dynamically generated search, report, edit and design windows (FIGS. 4–8), as well as a topology or a hierarchical schematic of the physical environment where the inventory is maintained (e.g., a hierarchical schematic of the space station, FIGS. 9–11). The menu bar 46 of the main window 44 also provides access to other typical features such as an inventory list and user-defined database forms and reports, and further provides access to conventional program elements such as user preferences (e.g., system colors, fonts, etc.) and an on-line help function.

As noted above, the main window 44 provides access to a number of windows that allow the contents of the relational database 24 to be queried, displayed or edited by an end user having no knowledge of either the relational database 24 itself or the SQL language typically used to interface directly with the RDBMS. Additional windows allow the same inexperienced end user to edit or redesign the structure of the relational database. Of course, these advantages and improvements are equally available to experienced database users or administrators. Each of these windows will be described below in relation to FIGS. 4–12.

The Search Window

Figure 4:
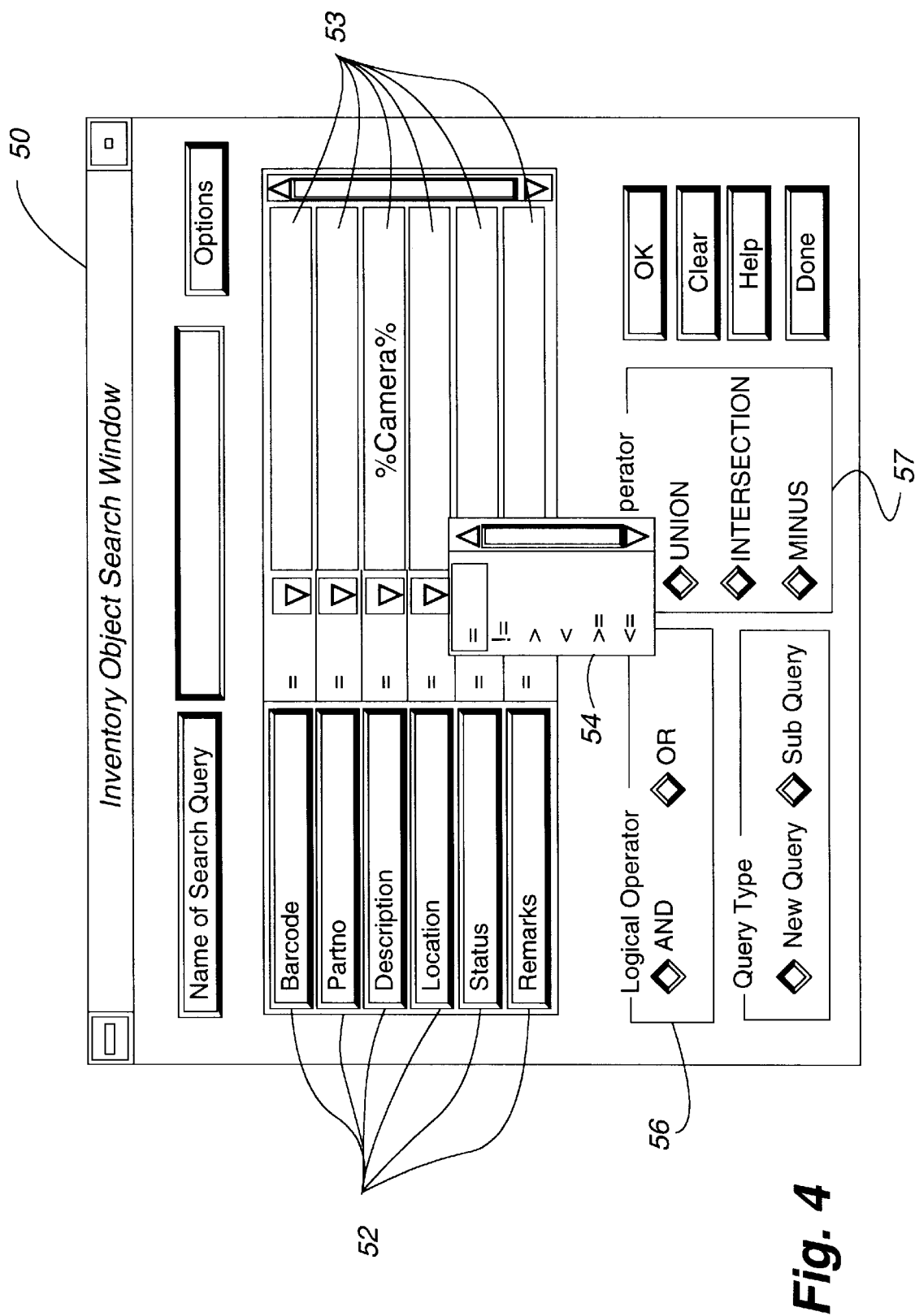
FIG. 4 is an illustration similar to the screen display shown in FIG. 3, in which a search window provides six different parameters for querying the relational database.

FIG. 4 illustrates a search window 50 dynamically generated by the DGUI of the present invention. The search window 50 allows end users to compose either simple or complex queries for the different tables within the relational database 24. The window 50 is preferably generated when a user chooses the "Search" option in the menu bar 46 of the main window 44 (FIG. 3) and specifies which database level is to be searched (e.g., a user would select "Level 5" to query the inventory object tables 25 and 26 shown in FIG. 1). Once a search level has been specified, the DGUI typically joins all the tables of the same level (e.g., table 25 and 26) by following the referential integrity constraints 30 defined within the data dictionary. In this manner, the DGUI identifies all possible parameters which may be relevant to a user's search at the specified level.

Within the search window 50, the DGUI defines a number of rows having parameter buttons 52 which correspond to the different columns from the joined tables 25 and 26 shown in FIG. 1. Although a user may specify (via the "Preferences" option in the menu bar 46 of the main menu 44, FIG. 3) which parameter buttons 52 will be offered within the search window 50 for each particular database level, it is assumed for the purposes of illustration that a user has previously specified that the six parameters shown in FIG. 4 (i.e., the six different columns from the joined tables 25 and 26 in FIG. 1) are to be included within the window 50 for all ISS inventory object searches (i.e., "Level 5" searches). A separate input field 53 is positioned adjacent each parameter button 52 to allow a user to input corresponding search terms into one or more of the blank fields 53 using one of the input devices 40 (FIG. 2). Thus, the search window 50 allows an end user to search the tables 25 and 26 (FIG. 1) by searching for entries in one or more of the columns in those tables. For example, the search window 50 illustrates a search for any use of the word "Camera" within the DESCRIPTION column of the tables 25 and 26.

The search window 50 allows a number of different mathematical operators to be associated with the search terms entered in the different input fields 53. For instance, a search may be conducted for a certain part number (e.g., PARTNO=100) or a range of part numbers (e.g., PARTNO>=100). A pull-down list 54 provides a choice of different mathematical operators from which an end user may choose. The search window 50 also provides a graphic block 56 which allows the end user to choose a logical operator (either an AND or an OR) to connect two or more specified search conditions within the fields 53 (e.g., PARTNO>=100 AND DESCRIPTION="Camera"). Subqueries can also be performed, and can be combined with set operators UNION, INTERSECTION, and MINUS by using a graphic block 57. Furthermore, provision is made for the use of standard wildcard characters (i.e., characters which match one or more characters within a text string) within the input fields 53 to enhance the scope of the search query by locating the search term within a larger text string. For example, the wildcard characters "%" have been used in the DESCRIPTION field 53 to locate all occurrences of the word "Camera" within the DESCRIPTION column of the tables 25 and 26 (FIG. 1).

Figure 5:
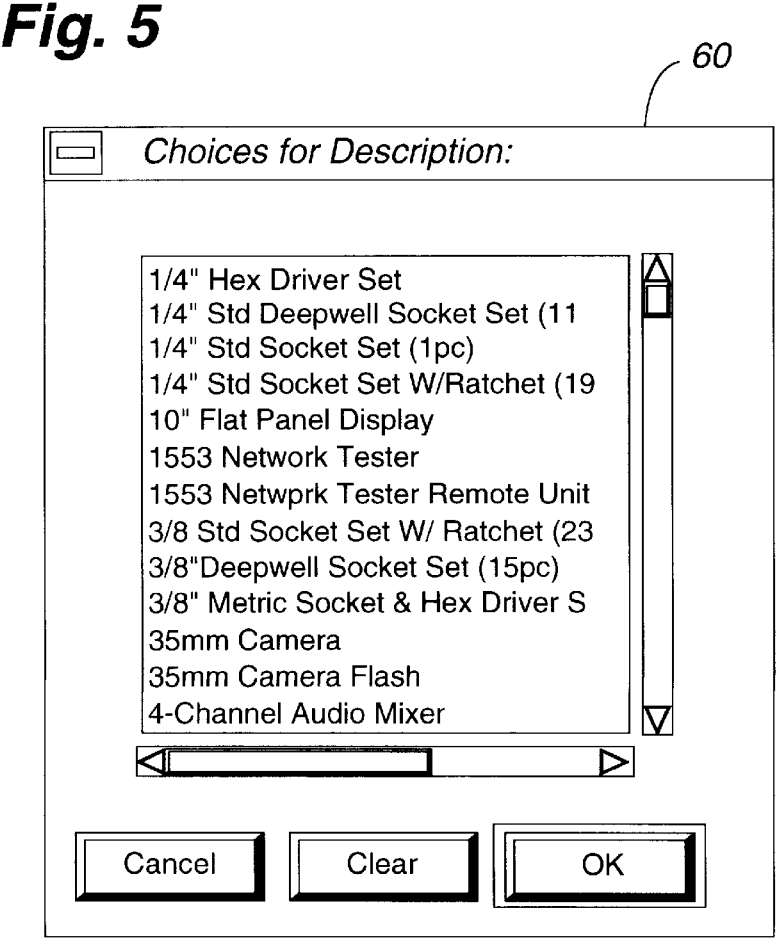
FIG. 5 is an illustration similar to the screen display shown in FIG. 3, in which a choices window is provided for the Description parameter within the search window shown in FIG. 4.

In addition to requiring an end user to manually input (i.e., type on a keyboard) entries into the search fields 53, a user may optionally access a choices window 60 shown in FIG. 5 which contains a list of the contents for each column of the specified database tables (FIG. 1). A separate choices window 60 is available for each of the parameter buttons 52 included in the search window 50 (FIG. 4). For example, FIG. 5 illustrates a sample choices window 60 which lists the current contents of the DESCRIPTION column of the tables 25 and 26, and the choices window 60 is preferably generated by clicking on the corresponding DESCRIPTION button 52 (FIG. 4) in the search window 50.

The choices window 60 thus allows a user to select (i.e., click on) a particular entry within the list of possible descriptions as opposed to typing the entry into the blank field 53 (FIG. 4). Additionally, as with the search window 50 itself, the choices window 60 is dynamically generated by the DGUI and thus reflects the current database contents for that particular parameter 52 (i.e., for that particular column of the relational database 24). Therefore, the inclusion of separate choices windows 60 enhances both the usability of the search window 50 and the accuracy of the search query by providing a user with an up-to-date list of all the possible entries for the fields 53 of the search window.

Once a search query is formulated in the search window 50 (FIG. 4), execution of the query is carried out in two separate steps. First, the DGUI converts the logical query input by the user in the search window 50 to corresponding SQL commands. Next, the RDBMS (e.g., the Oracle database) processes the SQL commands in a conventional fashion. Examples of converting graphical search queries to SQL are shown in the Cambot et al. patent referenced above. The results of the converted SQL search query are then returned from the RDBMS and displayed in a dynamically generated results window 70 shown in FIG. 6. The results window 70 includes a number of columns 72 which match those columns of the "Level 5" tables 25 and 26 shown in FIG. 1. As explained in greater detail below, the columns 72 of the results window 70 are dynamically generated by the DGUI (in the same manner as the parameter buttons 52 of the search window 50 and the contents of the choices window 60) to incorporate changes to the data dictionary (i.e., the structure) of the relational database 24. The results shown in the window 70 illustrate the different inventory objects within the relational database 24 which contain the word "Camera" in the Description column, as requested in the search window 50 (FIG. 4).

If a user desires to see a graphical image of one of the inventory objects listed in the results window 70, the user highlights the desired object and presses or clicks on a graphical "View" button 74 to launch a separate 3-D rendering or CAD program in a separate window. The inventory object catalog table 26 shown in FIG. 1 preferably includes a column containing a bitmapped image for each distinct inventory object part number (PARTNO) for use by the separate rendering program. Thus, in addition to providing a location and a written description in the results window 70, the present invention also allows a user to view an image of a requested inventory object by clicking on the "View" button 74. Such a viewing feature may help a user locate an item within one of the ISS container spaces, particularly if the user had not previously seen the item.

In addition to listing the search results and allowing a user to view an image of selected inventory items, the results window 70 further allows an end user to copy one of the search results to an edit window. For example, the end user could utilize one of the input devices 40 (FIG. 2) to highlight one of the search results or rows in the window 70 and then click on a "Copy to Edit Window" graphical button 76 to generate a separate edit window 80 shown in FIG. 7 for editing that particular search result (i.e., editing the data associated with that particular entry or row of the database table).

Figure 7:
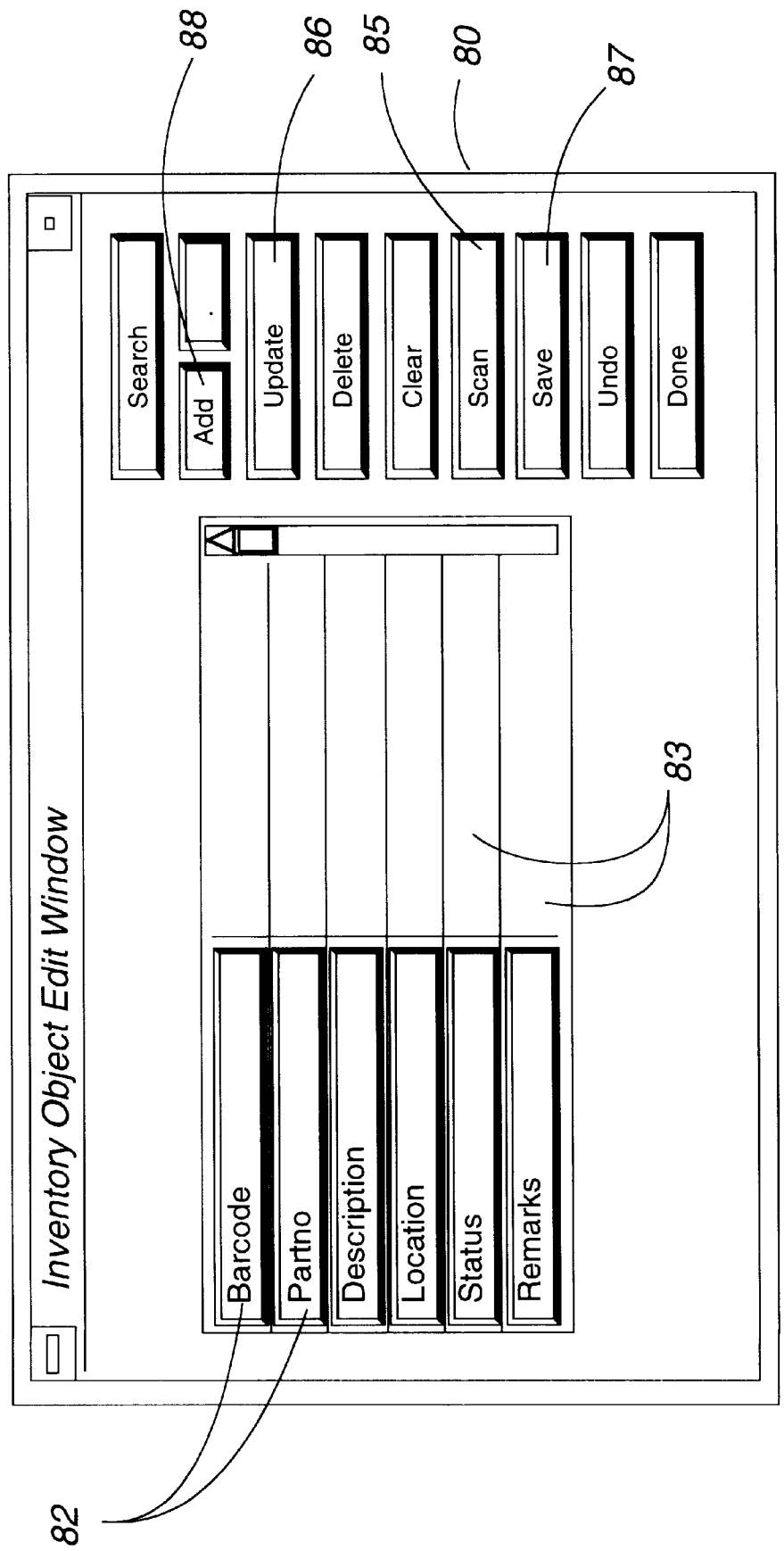
FIG. 7 is an illustration similar to the screen display shown in FIG. 3, in which an edit window is provided for modifying the contents of the relational database.

While the edit window 80 shown in FIG. 7 may be generated directly from the results window 70 via the button 76 (FIG. 6) as described above, a user may also call the edit window 80 from the main window 44 (FIG. 3). As with the search window 50 (FIG. 4), the edit window 80 is preferably generated when a user chooses the "Edit" option in the menu bar 46 of the main window 44 and specifies which database level is to be edited (e.g., a user would select "Level 5" to edit the inventory object tables 25 and 26 shown in FIG. 1). Once a search level has been specified, the DGUI typically joins all the tables of the same level (e.g., table 25 and 26) via the referential integrity constraints 30, as described above, to identify all of the parameters which may be edited at the specified level.

The edit window 80 shown in FIG. 7 includes a number of parameter buttons 82 corresponding to the names of the different columns within the tables 25 and 26 (FIG. 1) of the sample relational database 24. The parameter buttons 82 of the edit window 80 are similar to the parameter buttons 52 of the search window 50 (FIG. 4) and are dynamically generated by the DGUI to account for any intervening changes to the data dictionary of the relational database 24. Separate input fields 83 are positioned adjacent each parameter button 82 to allow a user to edit the information contained within those fields 83 by using one of the input devices 40.

If the edit window 80 is called from the main window 44 (FIG. 3), a user will be required to enter an appropriate value into the input field 83 corresponding to the primary key parameter of the database table to be edited. As noted above, the primary key parameter for the table 25 shown in FIG. 1 is the BARCODE column since a unique bar code number is assigned to each inventory item within the database. Thus, if the edit window 80 is not accessed through the search results window 70 (FIG. 6), a user will have to know the bar code number of the inventory object to be edited so that the relational database 24 can locate the proper row of the database table or tables and fill in the remaining fields 83 (FIG. 7) with the current parameter values. Alternatively, the user may utilize a conventional bar code reader (not shown) to scan the conventional bar code number into the edit field 83 after selecting a "Scan" button 85 (FIG. 7).

If the edit window 80 is accessed through the results window 70 (FIG. 6) as described above, each of the fields 83 will be filled with the current values contained within the relational database 24 for the specific object highlighted in the results window 70. This is the preferred method of editing existing objects within the relational database 24 since it does not require users to memorize the bar code number (or other primary key parameter value if database tables other than those tables 25 and 26 shown in FIG. 1 are being edited).

Once the current information is displayed within the fields 83, a user may update one or more of the fields by utilizing one of the input devices 40 (e.g., a keyboard, FIG. 2) to enter the new information. However, to prevent unauthorized users from accidentally or intentionally modifying the relational database 24, the RDBMS preferably assigns privileges to the different users. These assigned privileges may prevent certain users from editing certain columns within a table or from editing certain database tables all together. Thus, before generating the edit window 80, the DGUI preferably checks the user's privilege to determine which table columns (i.e., which parameters) the user is authorized to edit. If the specified user's privilege does not permit that user to edit certain parameters, the DGUI preferably hides the corresponding parameter buttons 82 and input fields 83 when generating the edit window 80.

Once the appropriate fields 83 have been edited, the user preferably clicks on the "Update" button 86 and then the "Save" button 87 to permanently save the new information. The DGUI then converts the entries within the window 80 to SQL commands and sends those commands to the relational database 24 to permanently update the database contents.

If new inventory items are to be added to the relational database 24, the edit window 80 (FIG. 7) is preferably accessed from the menu bar 46 of the main window 44 (FIG. 3) so that all the fields 83 of the edit window 80 are initially blank (as shown in FIG. 7). An authorized user (i.e., a user privileged to edit that particular database table) may then proceed to fill in each of the fields 83 to fully describe the new inventory item. Once the new parameter values are entered into the fields 83, the user preferably clicks an "Add" button 88 and a "Save" button 87 to permanently update the relational database 24 via the SQL-converting capability of the DGUI.

Separate choices windows 60 (FIG. 5) may be generated for each of the fields 83 within the edit window 80 by preferably clicking on the corresponding parameter button 82, as described above with respect to the search window 50 (FIG. 4). Appropriate entries from each of the choices windows 60 may be selected for each field 83 so that a user is not required to manually enter the information into the fields, with the exception of the primary key parameter discussed above since, by definition, a unique primary key parameter value must be assigned to each new object entered into any of the database tables. For example, with respect to the table 25 shown in FIG. 1, any new inventory item added to that table requires a new bar code number which would not be listed among the existing bar codes in a corresponding choices window 60. However, if the user simply desires to assign the next sequential bar code number to the new inventory item, the edit window 80 can enter that next bar code number as a default value in the appropriate input field 83.

Of course, if the new inventory item is distinct from all the existing inventory items within the relational database 24, additional new parameter items (other than a new bar code number) may also be defined within the fields 83 of the edit window 80. For example, if a new inventory item requires a new part number or a new description, the DGUI can add these new parameter items to the catalog table 26 (FIG. 1) of the relational database 24 once the new information is input into the appropriate fields 83 of the edit window 80. Once the RDBMS is updated, all future choices windows 60 (FIG. 5) will be similarly updated so that the new parameter items will be displayed in their corresponding choices window. For example, all future DESCRIPTION choices windows 60 (FIG. 5) generated by the DGUI will contain the new descriptions entered through the edit window 80.

Thus, by providing an end user with easy access to each field 83 in the edit window 80, the DGUI allows the user to edit the database information (i.e., either modify existing entries or add new entries) by simply inputting the new or corrected information into the appropriate fields 83. Once the updated information has been entered into the fields 83 of the edit window 80, the DGUI generates appropriate SQL commands which are then sent to the RDBMS to permanently edit the appropriate relational database tables. These updated tables are then utilized during the processing of further database queries. Thus, users of the RDBMS, such as the astronauts on board the ISS, are not required to have knowledge of SQL to edit or add to the contents of the relational database 24.

Figure 8:
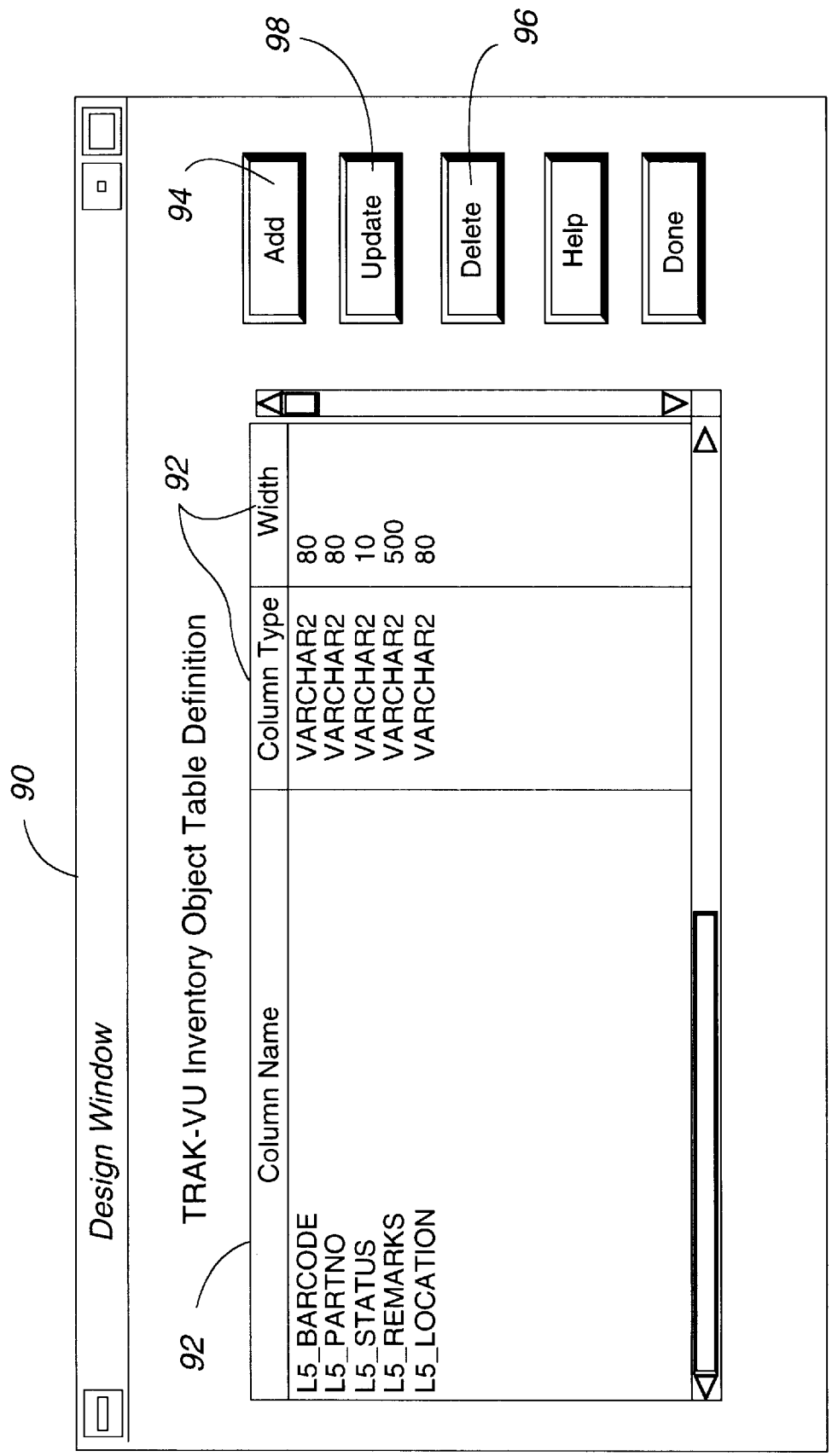
FIG. 8 is an illustration similar to the screen display shown in FIG. 3, in which a design window is provided for adding, deleting or modifying the columns of the relational database tables.

While the edit window 80 allows an end user to modify the contents of the relational database 24, a separate design window 90 shown in FIG. 8 allows an authorized end user to modify the structure or the data dictionary of the database itself. The design window 90 essentially allows a user having design privileges to modify the columns of a database table (e.g., the tables 25 and 26 shown in FIG. 1) as opposed to modifying, deleting or adding to the table contents (i.e., the rows of data within the table), as has been described in connection with FIGS. 4–7 above. For example, through the use of the design window 90, an authorized end user could add or delete columns to the inventory object table 25 (FIG. 1), or the user could modify the name or other attributes (e.g., the column type or width) assigned to existing columns within the table. In the past, such alterations to the underlying relational database 24 could only be accomplished by a skilled database manager having a working knowledge of SQL. However, the design window 90 provides inexperienced and experienced users alike with the ability to easily alter the structure or data dictionary of the relational database 24.

The design window 90 shown in FIG. 8 includes a number of data fields 92 which define the attributes of the different columns of the relational database tables, such as the tables 25 and 26 shown in FIG. 1. For example, the data fields 92 shown in FIG. 8 define the name, the type and the size or width of the columns within the inventory objects table 25 (FIG. 1). An "Add" button 94 allows a user to create a new column for the specified table (e.g., a new column for the table 25 shown in FIG. 1). New table columns may be of a type other than the character fields shown in FIG. 8. For example, a new table column could be added to represent the date on which an inventory item was borrowed. Such a column would preferably have a column type of DATE as opposed to VARCHAR2 in FIG. 8. Similarly, a "Delete" button 96 allows a user to remove unwanted table columns from a specified database table (e.g., the inventory objects table 25 of FIG. 1).

As noted above, an authorized user may also utilize the design window 90 to modify existing data fields 92 (i.e., column attributes) such as to change the size or width of a column or even to change the name of a column (e.g., changing the STATUS column in the table 25 to CONDITION by changing the column name in FIG. 8 from "L5__STATUS" to "L5__CONDITION"). A user can highlight and edit any of the data fields 92 within the design window 90 through the use of one of the input devices 40 (FIG. 2). The user then preferably clicks on an "Update" button 98 to permanently edit the data dictionary of the relational database 24. Once any changes have been made to the data fields 92 via the design window 90, the DGUI generates appropriate SQL commands which are sent to the RDBMS to make the requested alterations to the data dictionary of the relational database 24. Thus, no familiarity with SQL commands are required to modify the relational database structure.

Once structural changes have been made to the relational database 24 through the design window 90, these changes are reflected in the search window 50, the choices window 60, the results window 70 and the edit window 80 as each of those windows are subsequently generated by the DGUI. Indeed, the design window 90 itself is also dynamically generated in a manner similar to the windows shown in FIGS. 4–7 so that any prior changes to the structure of the relational database 24 will be reflected in the data fields 92 (FIG. 8) of the design window. The ability of the DGUI to recognize modifications to the structure of the relational database 24 (i.e., modifications to the data dictionary) and incorporate those modifications into each of the graphical windows shown in FIGS. 4–8 represents one of the significant improvements of the present invention. Because each of the windows 50, 60, 70, 80 and 90 are dynamically generated from both the contents and the data dictionary of the relational database 24, the DGUI does not require the intervention of a skilled software programmer to modify each of the graphical windows following a modification to the structure of the underlying relational database 24, as would typically be required by prior art, hard-coded graphical user interfaces.

In addition to the graphical windows shown in FIGS. 4–8, the DGUI also provides for dynamically generated hierarchical schematic representations of the container spaces (i.e., the physical environment) where the inventory objects are maintained. Although the container spaces may vary greatly depending on the particular inventory objects contained within the relational database 24 (e.g., parts contained within a warehouse or furniture contained within a showroom), the container spaces which are schematically depicted in FIGS. 9–11 are those of the ISS.

The dynamic schematic representations of the ISS may be used independently or in conjunction with the search and results windows 50 and 70, respectively, by selecting the "Topology" option from the menu bar 46 of the main window 44 (FIG. 3). For instance, when the schematic representations are accessed without first running a search query via the search window 50, a location selector (e.g., a pop-up window) may be utilized to select which level of the space station should be schematically represented. For example, upon selecting the "Topology" option from the menu bar 46, a user may instruct the DGUI to display a "Level 1" (overall or top level) schematic representation 110 of the ISS as shown in FIG. 9. Of course, if the relational database 24 were used with a different inventory such as items stored within one or more warehouses, the top level schematic representation 110 might display the floor plan of a warehouse or a map showing the locations of a number of warehouses.

Figure 9:
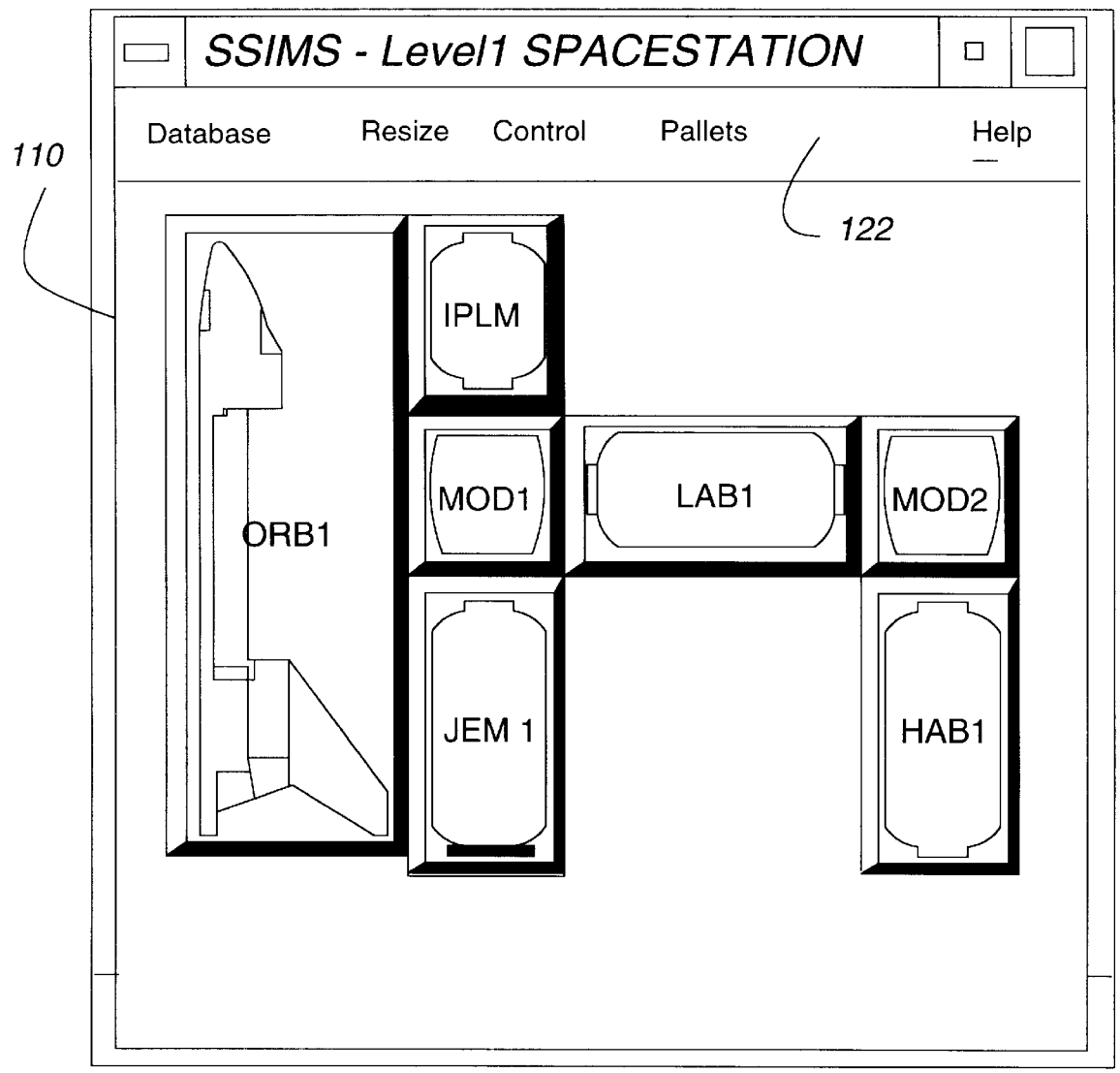
FIG. 9 is an illustration similar to the screen display shown in FIG. 3, depicting a schematic representation of a plurality of modules which define inventory storage areas for the ISS.
Figure 10:
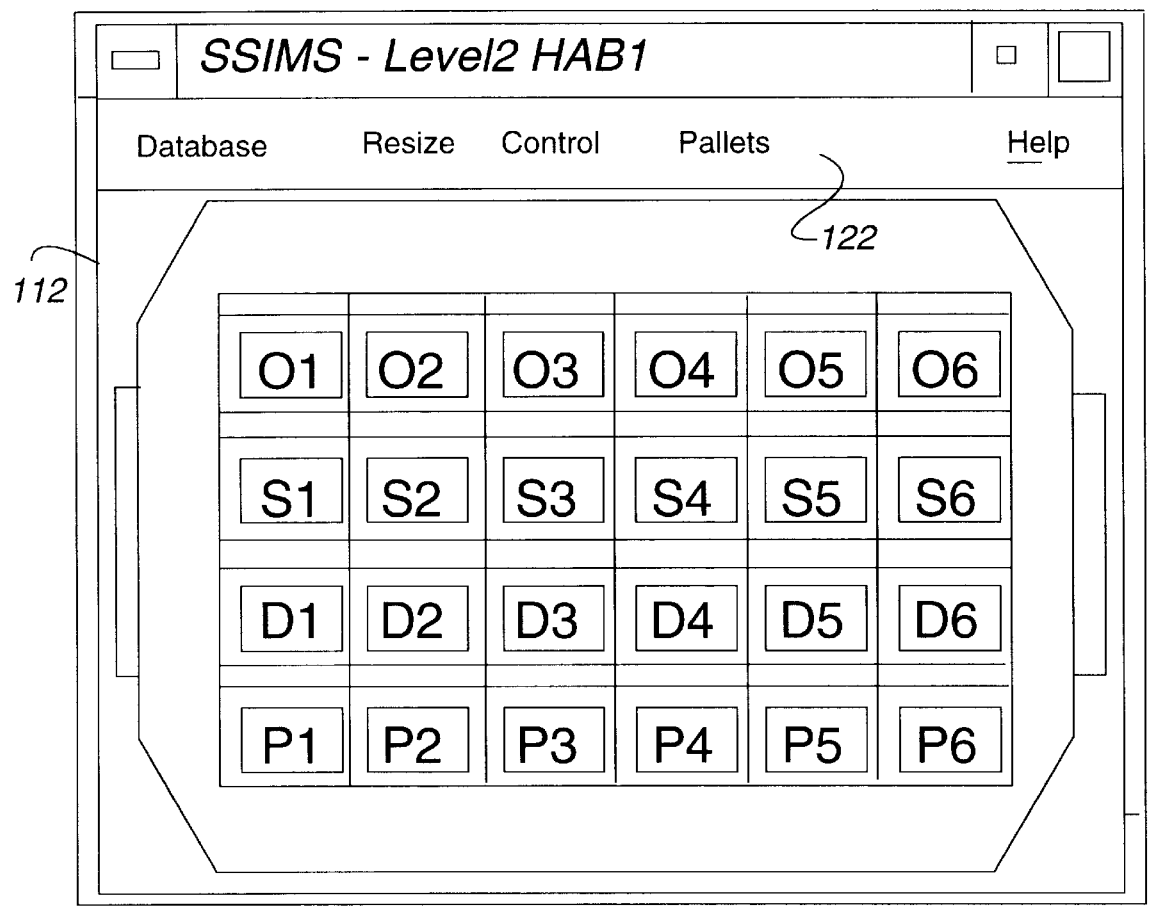
FIG. 10 is an illustration similar to the screen display shown in FIG. 9, depicting a schematic representation of inventory storage racks available within a habitation module of the ISS shown in FIG. 9.
Figure 11:
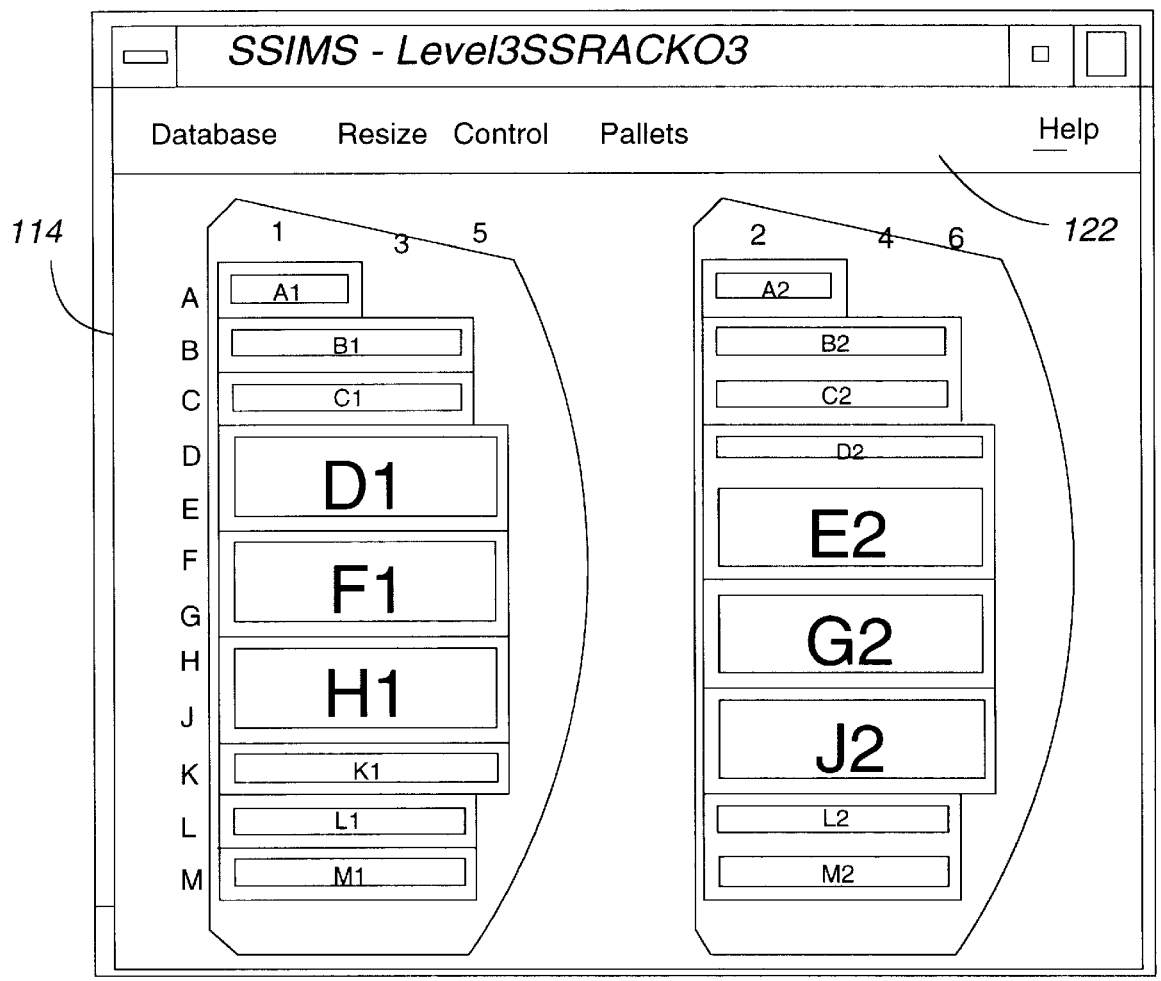
FIG. 11 is an illustration similar to the screen display shown in FIG. 9, depicting a schematic representation of inventory storage trays available within one of the storage racks shown in FIG. 10.

Once a user has generated the top level ("Level 1") schematic 110 shown in FIG. 9, the user could then move through the schematic hierarchy of the ISS as shown in FIGS. 10 and 11. For example, by selecting the habitation module HAB1 shown in FIG. 9, a user could display a module level ("Level 2") schematic 112 of the equipment racks available in the habitation module, as shown in FIG. 10. The habitation module shown in FIG. 10 depicts six racks along each of the overhead ("O"), starboard ("S"), deck ("D"), and port ("P") walls. Similarly, the user could then select one of the racks shown in FIG. 10 to generate a rack level ("Level 3") schematic 114 (FIG. 11) which displays the different trays available in the selected rack. As an example, FIG. 11 illustrates a schematic of the different trays to be found in Rack O3 (overhead rack number 3) which was selected from the module level view of the habitation module HAB1 shown in FIG. 10. Clicking on one of the trays shown in FIG. 11 preferably generates a pop-up list of the different inventory items stored in that particular tray. Similarly, pop-up inventory lists may be generated at any level within the schematic representations (e.g., a list of all of the inventory objects contained in one of the racks shown in FIG. 10 or a list of all the inventory objects contained within one of the space station modules shown in FIG. 9). Thus, the DGUI allows a user to move between the different schematic representations of the ISS to view the different levels of the container spaces on board the ISS.

In addition to browsing the different modules, racks and trays which represent the different container spaces on board the ISS, the schematic representations shown in FIGS. 9–11 can also be used in conjunction with the search results window 70 (FIG. 6) described above to schematically display the location of search results. For instance, once a user conducts a search using the search window 50 (FIG. 4) and receives the search results in the results window 70 (FIG. 6), these same search results will be highlighted on the schematic representations depicted in FIGS. 9–11, when selected.

When a user clicks on the "Topology" option from the main window 44 (FIG. 3) after querying the relational database 24 via the search window 50 and obtaining the search results, the DGUI highlights appropriate ones of the container spaces on the schematic representations in FIGS. 9–11 based on the LOCATION parameter of each object contained in the search results. The location of each object is based on the hierarchical organization of the different container spaces (i.e., the modules, racks and trays) within the space station. For instance, the 35 mm Camera Flash described in the last line of the results window 70 (FIG. 6) may be located in tray F1 in the #3 overhead rack of the habitation module HAB1 (see FIGS. 9–11). If viewed in the results window 70 or in the table 25 shown in FIG. 1, its location would preferably be noted as Hab1_O3_F1. However, a user could also view a schematic representation of this location by selecting the "Topology" option from the main window menu bar 46 (FIG. 3). The user would then preferably be presented with a top level ("Level 1") schematic view of the space station similar to that shown in FIG. 9, but with the appropriate module highlighted (i.e., the habitation module HAB1) to indicate the presence of the selected inventory item in that module. The user could then select or click on the schematic HAB1 module to be presented with a module level ("Level 2") view similar to that shown in FIG. 10 where the particular rack containing the desired inventory item (e.g., rack O3) would be highlighted by the DGUI. The user could then click on the schematic representation of the third overhead rack to be presented with a rack level ("Level 3") view similar to that shown in FIG. 11 where the particular tray containing the desired item (e.g., tray F1) would be highlighted. Alternatively, the user may select a specific topology level using the above-described pop-up location selector window (not shown) to avoid "drilling down" or moving hierarchically through the different levels of the topology. Of course, once the rack level of the topology is reached, a user may display an inventory list (not shown) and graphical representations (not shown) of the different inventory objects, as described above.

Thus, a user may utilize the schematic representations (e.g., FIGS. 9–11) to find a particular inventory object by first conducting a search using the search window 50 and then moving through the different schematic levels to locate the particular container for the object. The DGUI aids the user in this search by highlighting the location of the object at each level of the schematic representation. However, the schematic representations may also be used to edit the locations of certain inventory objects without requiring the user to manually update the new locations of the objects using the edit window 80 (FIG. 7). For example, if an inventory object is to be permanently moved from one tray to another, an authorized user (i.e., a user having sufficient privileges) may perform a task commonly known as a "drag and drop," whereby the item is picked up from its old location on the schematic representation and dragged to its new location. If the new tray is located within a different rack, either on the same module or a different module, a second window is preferably opened to allow a user to drag the item directly from its old location to its new location. Once the user has moved the inventory item via the schematic representations, the DGUI generates an appropriate SQL command and sends that command to the RDBMS to update the location of the particular item within the relational database 24. Similarly, entire trays may be moved between racks and entire racks may be moved between different modules via the schematic representations shown in FIGS. 9–11. Additionally, new station modules may be graphically moved from the shuttle orbiter to the ISS during resupply missions.

Furthermore, because the locations of the different inventory objects are hierarchically organized (i.e., a parent-child relationship is defined between the different container spaces), the RDBMS can efficiently move a large number of inventory objects between two locations with a single database update. Thus, for example, when a tray or a rack is moved between modules of the ISS, the relational database 24 is only updated one time (i.e., the location of the tray or the rack is updated) without requiring that the locations of each of the inventory objects contained within the tray or the rack be individually updated. This is because each database object only points to or relates to its parent container space and does not point to higher levels of container spaces. Using the five-level hierarchy of the ISS as an example, each inventory ("Level 5") object points to a given tray ("Level 4") object, while each tray ("Level 4") object points to a given rack ("Level 3") object, and each rack ("Level 3") object points to a given module ("Level 2") object, while each module ("Level 2") object points to the space station ("Level 1"). Additionally, the DGUI also supports nonstandard locations in order to accommodate temporary inventory configurations (e.g., trays ("Level 4") positioned directly within a module ("Level 2") while new racks are being installed). Thus, if a rack is moved to a new module, only its parent pointer is updated to point to the new module, while all of the trays (and the inventory objects contained within those trays) are not modified. Therefore, the schematic representations shown in FIGS. 9–11 may be used more efficiently than the edit window 80 (FIG. 7) to update the locations of a plurality of inventory items which are moved together between different racks, different modules or even between different spacecraft.

Like the dynamically generated windows shown in FIGS. 4–8, the schematic representations shown in FIGS. 9–11 are automatically updated with each change to either the contents or the structure of the relational database 24. Additional tables (not shown) within the relational database 24 (e.g., tables other than the "Level 5" tables 25 and 26 shown in FIG. 1) store graphical information pertaining to the different levels of container spaces on board the ISS. For example, the relational database 24 may include separate catalog tables for each container space level, and these catalog tables preferably include bitmaps, size and grid location information for each of the available container objects (e.g., FIG. 11 illustrates a grid which defines unique locations for each of the trays contained within the "O3" rack). The graphical information contained within these additional tables (not shown) is preferably linked or related to objects within other tables of the relational database 24 through a referential integrity constraint 30 (FIG. 1) as described above. The DGUI thus utilizes the information within these additional tables (not shown) to properly position and size the different schematic representations in FIGS. 9–11.

Thus, as the physical configuration of the ISS is updated over time (i.e., as the storage space on board the space station is altered through the addition of new modules, racks or trays), a user may update the relational database 24 by modifying the schematic representations (FIGS. 9–11) of the container spaces on board the ISS. For example, if a new habitation module HAB2 (not shown) is connected to the ISS (e.g., connected to the connecting node NOD2), a user can add the new HAB2 module directly to the schematic representation (FIG. 9) through the use of a pallet window 120 shown in FIG. 12 which contains the graphical objects used by the DGUI to build each schematic representation.

Figure 12:
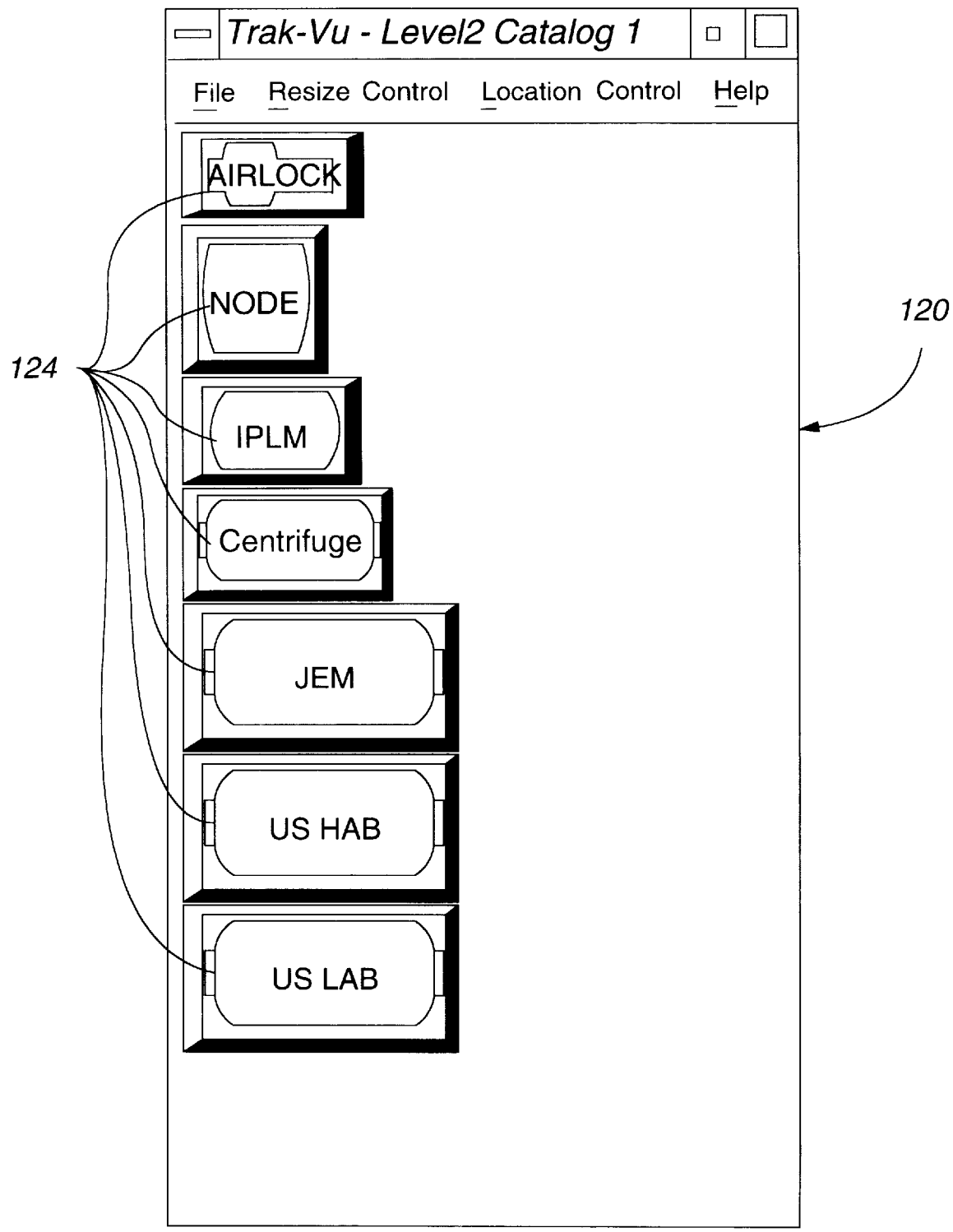
FIG. 12 is an illustration similar to the screen display shown in FIG. 9, depicting a pallet window containing schematic representations of additional modules which may be added to the ISS shown in FIG. 9.

The pallet window 120 is preferably accessed through a "Pallets" option from a menu bar 122 in each of the windows (110, 112 and 114) displaying the schematic representations shown in FIGS. 9–11. Preferably, a separate pallet window 120 is dynamically generated by the DGUI for each of the different ISS container space levels based on the graphical information stored within the additional tables discussed above. For example, the pallet window 120 shown in FIG. 12 provides the user with a pallet of different modules 124 which may be added to the top level ("Level 1") schematic representation shown in FIG. 9, while separate pallet windows (not shown) preferably provide the user with a pallet of racks which may be added to the module level ("Level 2") schematic representation in FIG. 10 or a pallet of trays which may be added to the rack level ("Level 3") schematic representation in FIG. 11. Of course, constraints placed on each of the catalog tables described above define valid locations for the placement of new container spaces.

Each pallet window 120 (FIG. 12) is dynamically generated by the DGUI from one of the catalog tables discussed above. Thus, users may add, delete or modify the graphical objects within each pallet window 120 by using an edit window, similar to the window 80 shown in FIG. 7, to edit the pertinent catalog tables containing the graphical information utilized by the DGUI to draw the graphical objects.

Once changes have been made to the schematic representations shown in FIGS. 9–11 or to one of the pallet windows 120 (FIG. 12), the DGUI updates the relational database 24 by generating appropriate SQL commands and sending those commands to the RDBMS to permanently edit the appropriate database tables. Thus, the schematic representations shown in FIGS. 9–11 not only allow a user to navigate the different levels of the container spaces available on board the ISS, but also allow relatively inexperienced and experienced users alike to modify the relational database 24, such as by moving inventory objects between different container spaces, without requiring a knowledge of SQL commands and without requiring the user to edit the location of each individual object in distinct edit windows 80. Additionally, through the use of the pallet window 120 (FIG. 12), authorized users may graphically edit the valid or available container spaces (i.e., updating the database to reflect changes to the ISS such as the addition of new modules or the placement of new racks or trays within existing modules) by manipulating the schematic representations in FIGS. 9–11.

Regardless of whether the design window 90 or the Topology function is utilized to edit the data dictionary of the relational database 24, any changes to the data dictionary trigger the setting of a flag (e.g., changing a boolean variable from FALSE to TRUE) which indicates to the DGUI of the present invention that a modification has been made to the structure of the database. This flag is preferably checked prior to the generation of each of the windows described above so that the windows may be regenerated when the flag indicates a modification to the database structure. This dynamic regeneration process is discussed in greater detail in the following section.

Self-Modifying Nature of the Graphical User Interface

As noted above, the windows shown in FIGS. 4–12 are dynamically generated by the DGUI each time the data dictionary of the relational database 24 is modified. The regeneration of these windows represents a significant improvement over prior art hard-coded graphical user interfaces which must be modified by a software programmer to account for changes to the data dictionary.

In order to incorporate changes to the structure of the underlying relational database 24, the DGUI of the present invention determines what columns have been defined in the different tables of the database, the type of data stored in the columns, and the constraints imposed on those columns. This is preferably accomplished by the present invention through the use of Oracle's Pro C Dynamic SQL Method 4 (see the Programmer's Guide to the Oracle Pro*C/C++ Precompiler, Release 2.1, Oracle Corporation, March 1995, Part No. A21021-2).

The DGUI of the present invention is preferably written in conventional "C" language. Additionally, as noted above, the DGUI of the present invention preferably works in conjunction with the conventional Oracle™ 7 RDBMS. Furthermore, the DGUI preferably interacts with the RDBMS via Oracle's Pro C language. The Pro C language is a SQL precompiler that allows SQL commands to be embedded within a conventional C program. The precompiler pre-processes the SQL statements and replaces them with native call statements that the C compiler recognizes. The C program then interfaces with the relational database 24 via native C calls during execution.

Although Oracle currently has four available Dynamic SQL Methods which allow host programs to accept and process dynamically defined SQL statements, Method 4 is preferably used in the present system due to its flexibility. Method 4 allows the DGUI to query the relational database 24 without any prior knowledge about the column definitions of a given table. Thus, because the table definitions (i.e., the table columns, column data types and constraints) contained within the data dictionary may change during run time, Method 4 allows the present invention to determine the new table definitions before executing SQL queries or building graphical windows (e.g, FIGS. 4–12).

Significantly, as explained in greater detail below, Method 4 is not employed by the present invention to select data from the tables of the relational database 24, but rather Method 4 is used to deduce the structure of the tables and the attributes of the columns. This is accomplished by means of a "select descriptor" or an area of memory which holds complete descriptions of the columns in a table. The select descriptor is preferably located in a memory area that can be shared by both the RDBMS and the DGUI of the present invention so that the information can be continuously updated by the RDBMS and accessed by the present invention to build the windows shown in FIGS. 4–12. The process of forming the select descriptor and building the above-described windows is described below in relation to the flow diagrams in FIGS. 13–20.

Figure 13:
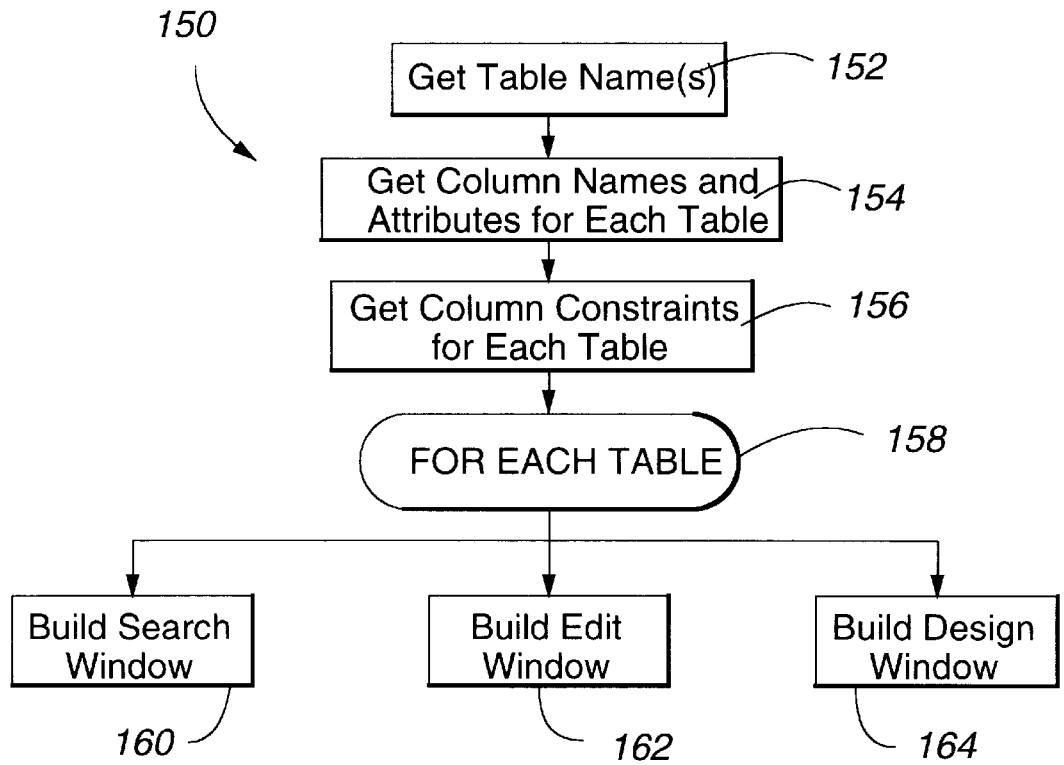
FIG. 13 is a flow diagram illustrating a main sequence of the most generalized tasks and functions performed according to the present invention.

FIG. 13 provides an overview of the steps preferably performed by the present invention each time the DGUI recognizes that a change has been made to the data dictionary (i.e., notes that the above-described boolean flag has been changed to TRUE), with each step being identified by a separate reference number. Each of the steps in FIG. 13 are further described in FIGS. 14–20. Because implementation of the present invention may vary depending on the RDBMS with which it is used, the following description of FIGS. 14–20 is necessarily functional in nature, although exemplary SQL commands are included within the description to more fully explain the program flow. The SQL commands are typically capitalized for purposes of clarity.

FIG. 13 represents a main sequence 150 initiated by a user request to access the relational database 24 following a modification to the data dictionary. The conventional processor (not shown) of the workstation 33 (FIG. 2) preferably performs these steps by executing the programmed instructions stored within the nonvolatile memory of the workstation 33 and selectively accessing the relational database 24 and the data dictionary across the network 36 (if employed). Thus, in response to user inputs via the input devices 40, the workstation 33 regenerates the different windows depicted in FIGS. 4–12 by performing the steps summarized in FIG. 13. The main sequence 150 calls multiple subroutines to identify the table names and columns, as well as the constraints and relationships of the columns. The main sequence 150 then generates the different windows of the DGUI (FIGS. 4–8), including the search, edit and design windows 50, 80 and 90, respectively.

As shown in FIG. 13, the first step (at 152) within the main sequence 150 determines the names of the database tables which are to be queried or edited by the user. Next, the names and attributes (e.g., data type, length, precision, etc.) of each column within each of the tables are determined at step 154. A determination is then made at step 156 of the constraints assigned to the columns identified in step 154. The column constraints essentially act as indicators to describe the type of information stored in the column and the relationship between that information and other data stored within other columns of the relational database 24. Next a loop is initiated at 158 so that steps 160, 162 and 164 are repeated for each table determined in step 152. Step 160 utilizes the information determined in steps 152, 154 and 156 to graphically build the search window 50, while steps 162 and 164 utilize the same information regarding the structure of the relational database 24 to build the edit window 80 and the design window 90, respectively. Each of these steps are described in greater detail below. Furthermore, while these steps are preferably described for use with the Oracle™ 7 RDBMS and Oracle's Pro C Dynamic SQL Method 4, it is to be understood that the steps of the present invention may be performed with other languages and with other relational database management systems.

Figure 14:
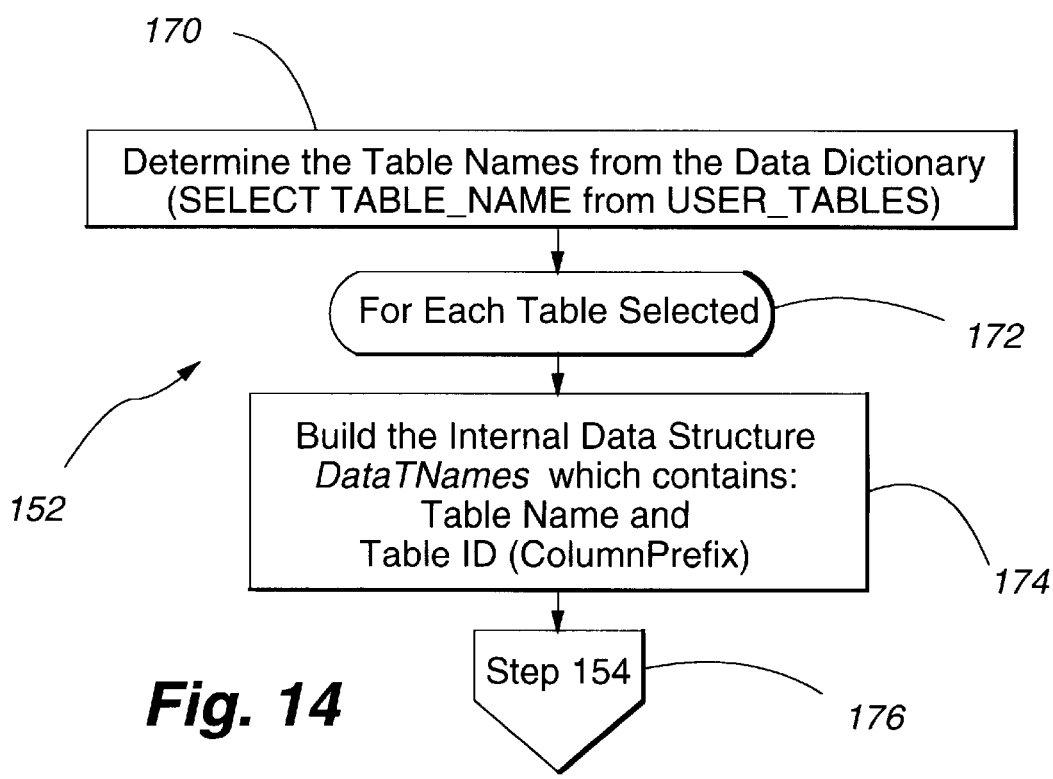
FIG. 14 is a flow diagram illustrating the functions associated with the Get Table Name(s) task shown in FIG. 13.

The step 152 of determining the names of the tables within the relational database 24 is described in greater detail in conjunction with FIG. 14. The names of all the tables stored within the Oracle RDBMS are typically stored in a table called USER_TABLES within the Oracle data dictionary. The table USER_TABLES includes a column TABLE_NAME under which the different table names of the relational database 24 are stored. Step 170 (FIG. 14) determines the names of the tables by generating a SQL SELECT statement such as SELECT TABLE_NAME FROM USER_TABLES. Because the program embodying the present invention is preferably called TRAK-VU™, and because of the multiple levels of container spaces defined on board the ISS, an example of the list of table names which may be retrieved by the SELECT statement in step 170 includes: TRAKVU_L0; TRAKVU_L1; TRAKVU_L1C; TRAKVU_L2; TRAKVU_L2C; TRAKVU_L3; TRAKVU_L3C; TRAKVU_L4; TRAKVU_L4C; TRAKVU_L5; and TRAKVU_L5C.

A loop 172 is then initiated for each of the tables selected in step 170. Step 174 builds an internal data structure called DataTNames which stores the table name and table ID or identification for each of the tables selected in step 170. A table ID is determined from the suffix of the table names, and thus both the table name and the table ID may be determined from the USER_TABLES table within the Oracle data dictionary. For example, the table names listed in the above paragraph above would have the following table IDs: L0; L1; L1C; L2; L2C; L3; L3C; L4; L4C; L5; and L5C.

The table IDs are associated with each column of the above database tables by incorporating the table IDs (as a prefix) into the column names of each column from the corresponding table. For example, with respect to the inventory object table 25 shown in FIG. 1, that table is preferably named TRAKVU_L5 and contains information regarding the "Level 5" inventory objects in the ISS inventory database. Therefore, the table ID for the table shown in FIG. 1 is L5, and the names of the five columns shown in that table are as follows: L5_BARCODE; L5_PARTNO; L5_LOCATION; L5_STATUS; and L5_REMARKS.

Thus, the step 174 within the loop 172 operates to build the internal data structure DataTNames by storing the table name and the table ID or column prefix for each table within the relational database 24. Once the names and column prefixes of each table has been stored in DataTNames, step 176 in FIG. 14 returns the program flow to the main sequence 150 (FIG. 13) at step 154.

Figure 15:
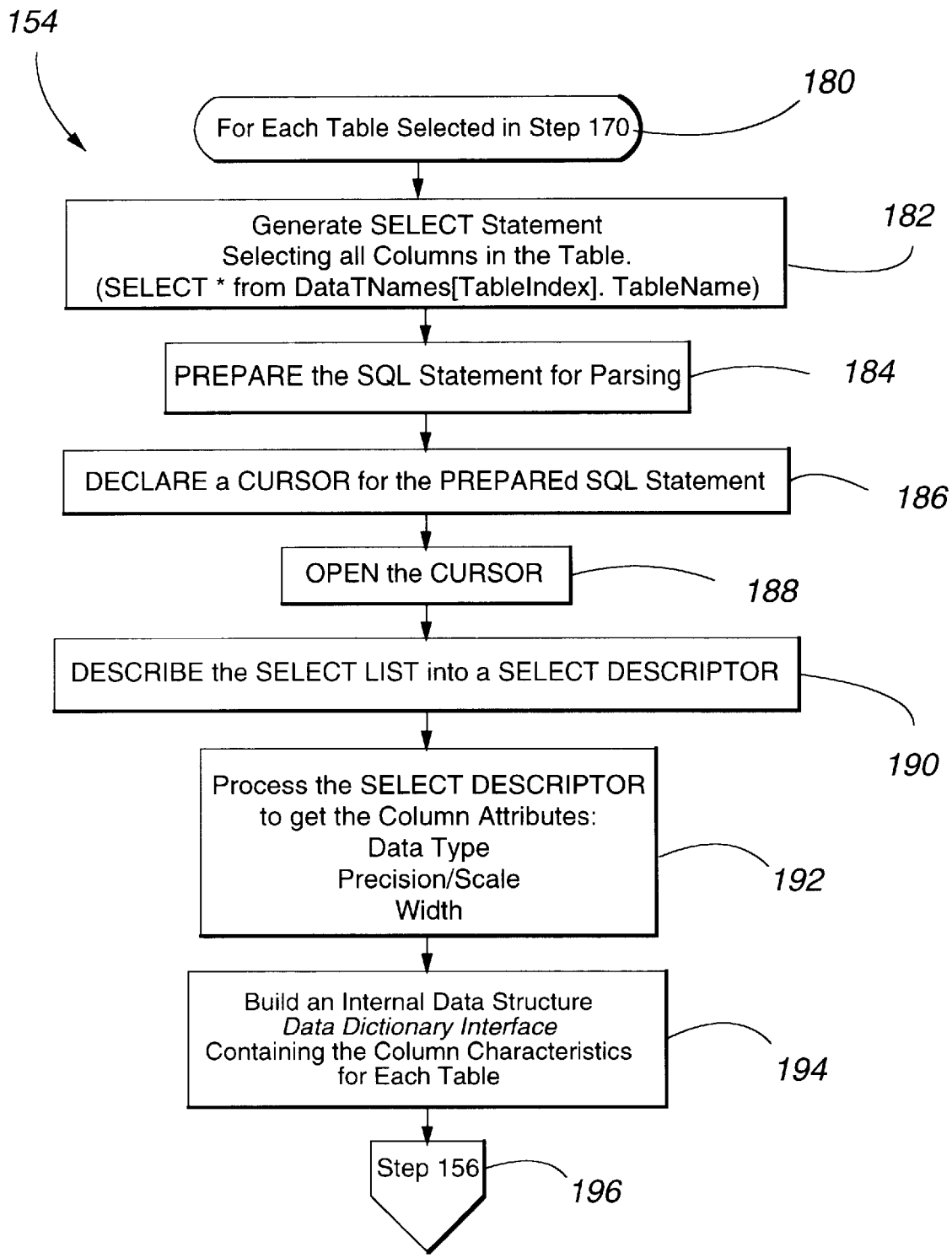
FIG. 15 is a flow diagram illustrating the functions associated with the Get Column Names and Attributes task shown in FIG. 13.

The step 154 of determining the column names and attributes for each of the tables determined in step 152 (FIG. 13) is further described in conjunction with FIG. 15. In order to dynamically determine the column names and attributes of all the database tables (i.e., the structure of the relational database 24), Oracle's Pro C Dynamic Method 4 is preferably used as described above. Method 4 allows the program of the present invention to access Oracle data structures, known as descriptors, which hold a complete description of the variables in a dynamic SQL statement. In essence, the descriptors are built as the Oracle RDBMS processes or DESCRIBEs a SQL SELECT statement. Thus, the DGUI of the present invention preferably generates a SQL SELECT statement selecting all the columns for each of the tables stored in the previously built DataTNames data structure. The SELECT statement is then DESCRIBEd to form a select descriptor which, in turn, is processed to obtain the column names and attributes for each database table. This information is then stored within a new internal data structure known as DataDictionaryInterface for use in building the DGUI. These steps are described in greater detail below with respect to the flow diagram shown in FIG. 15.

First, a loop is initiated at 180 (FIG. 15) to allow each of the tables selected in step 170 (FIG. 14) to be separately described. Next, a SELECT statement is generated at step 182 to select all the columns for each table stored within the previously constructed DataTNames data structure. Since the different table names (e.g., TRAKVU_L0, TRAKVU_L1, etc.) are preferably listed within the DataTNames data structure by a table index number, the SQL SELECT statement will be similar to that shown in step 182 (FIG. 15) where a TableIndex variable is preferably incremented each time through the loop defined at step 180 to ensure that a SELECT statement is generated for each of the tables within the DataTNames data structure.

Once a SELECT statement is generated at step 182, the SELECT statement is PREPAREd for parsing at step 184. As noted in the glossary section above, the parsing of a SQL statement essentially checks the statement for syntactic and semantic validity. Next, a CURSOR or memory pointer is DECLAREd from the PREPAREd SELECT statement at step 186. The CURSOR is then OPENed at step 188 to allocate an area of memory for the dynamic SQL query. Next, at step 190, a DESCRIBE SELECT LIST is issued to initialize the Oracle descriptor to hold the descriptions of the list of columns generated by the SELECT statement in step 182. Furthermore, because a wildcard ("*") was preferably used to SELECT all the columns within a selected table or tables in step 182, descriptions are initialized for each of the table's columns, including the column name, data type, width, scale, etc. These table descriptions, known as SELECT DESCRIPTORS, are stored in a SQL descriptor area where they can be accessed by the DGUI of the present invention for column information.

Next, at step 192, the SELECT DESCRIPTOR is processed to obtain the different column names and attributes (e.g., data type, width, etc.) for each column. However, because the contents stored within the database tables (i.e., the row information) are not needed at this time, only the SELECT DESCRIPTOR is processed at step 192 and a FETCH is never performed on the SELECT statement generated in step 182. In step 194, the column information obtained from processing the SELECT DESCRIPTOR in step 192 is stored within a new internal data structure called DataDictionaryInterface for later use in building the different windows shown in FIGS. 4–12.

Thus, the steps 182–194 within the loop 180 operate to build the internal data structure DataDictionaryInterface generating a SELECT statement to build a SELECT LIST and then DESCRIBing that SELECT LIST and processing the resulting SELECT DESCRIPTOR to store the column name and attributes for each table without completing the SELECT statement and FETCHing the database contents. Once the DataDictionaryInterface data structure is built with the column names and attributes for each of the tables selected in step 170 (FIG. 14), step 196 in FIG. 15 returns the program flow to the main sequence 150 (FIG. 13) at step 156.

Once the column names and attributes have been determined, the DGUI of the present invention determines the different constraints imposed upon the database tables. The step 156 of determining the column constraints for each of the tables determined in step 152 (FIG. 13) is further described in conjunction with FIG. 16.

Two different constraints are typically identified for each database table: a primary key constraint and a referential integrity constraint. As noted above, the primary key is the column of a database table which contains a unique value for each row of data within that table (e.g., the BARCODE column within the inventory object table 25 shown in FIG. 1). The primary key column for each database table must be determined before any edits may be made to the contents of that table because the primary key is required in order to find the unique row in the table to be edited.

On the other hand, a referential integrity constraint sets up relations between two tables in the relational database 24 via a common column in each table (see, for example, the referential integrity constraint 30 shown in FIG. 1 between the L5_PARTNO column in the TRAKVU_L5 table 25 and the L5C_PARTNO column in the TRAKVU_L5C parent table 26). As noted above, the TRAKVU_L5C table 26 contains the catalog entries (e.g., description, cost, graphical information, etc.) for each inventory ("Level 5") object. Therefore, all information which is shared among "Level 5" (inventory) objects of the same part number (PARTNO) is stored in the "Level 5" Catalog (the table TRAKVU_L5C) in order to reduce the size of the inventory object (TRAKVU_L5) table and thus the storage requirements for the relational database 24.

Figure 16:
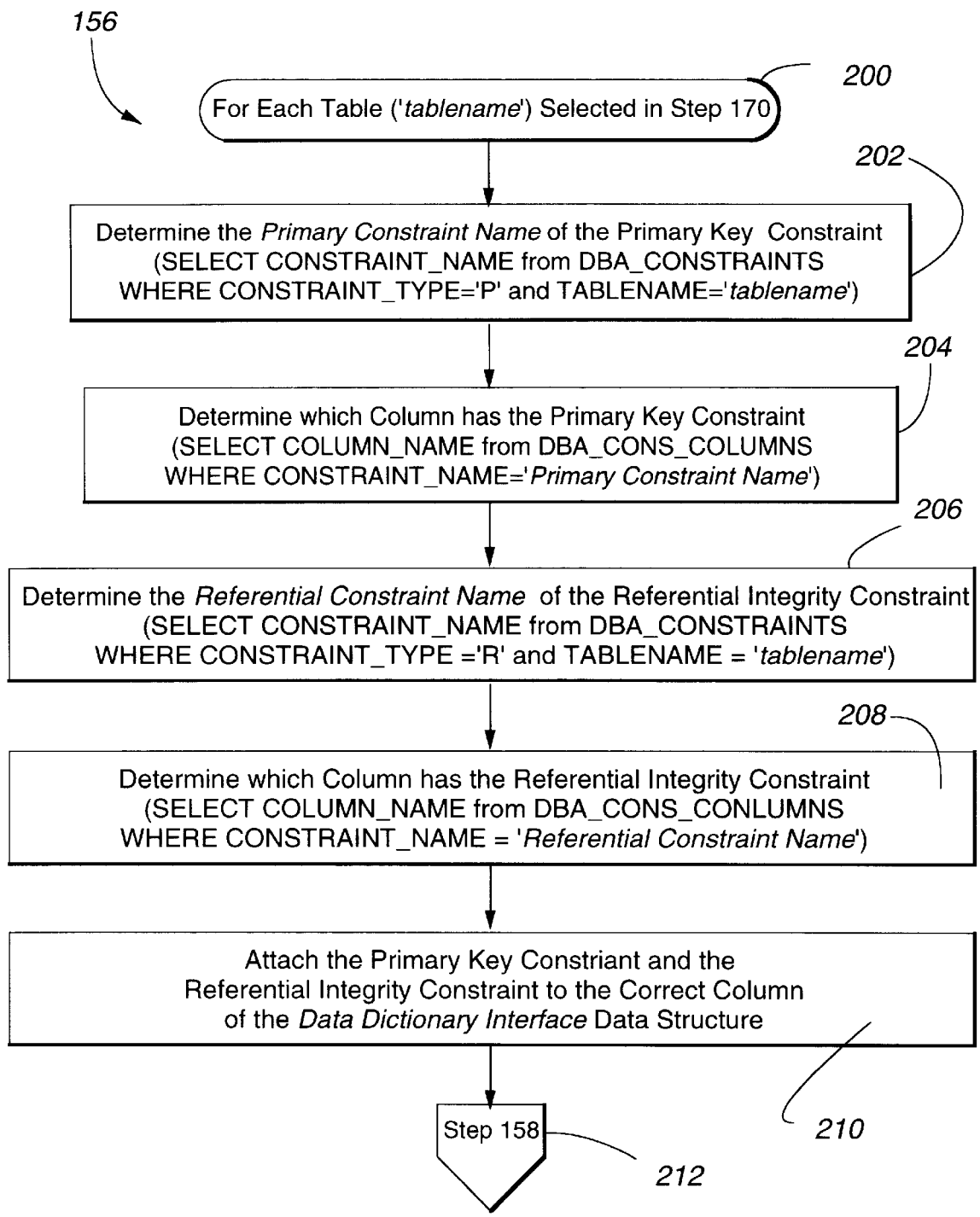
FIG. 16 is a flow diagram illustrating the functions associated with the Get Column Constraints task shown in FIG. 13.

The first step in determining the above-referenced column constraints is to initiate a loop at 200 shown in FIG. 16 to allow the column constraints for each of the tables selected in step 170 (FIG. 14) to be separately determined. Next, the primary key constraint and referential key constraint are separately determined for each separate table (having a distinct name generally referred to as tablename) within the loop initiated at step 200.

Each constraint within a database table has an associated name and a constraint type. Additionally, all constraints for all the tables are preferably stored within a table ("DBA_CONSTRAINTS") in the Oracle data dictionary. Thus, the next step 202 (FIG. 16) is to SELECT the CONSTRAINT_NAME from the DBA_CONSTRAINTS table where the CONSTRAINT_TYPE equals "P" and the TABLENAME='tablename' to determine the primary key constraint for that particular table.

Once the Primary Constraint Name is determined for the corresponding tablename in step 202, the name of the column within the table tablename having the constraint Primary Constraint Name can be identified from another table ("DBA_CONS_COLUMNS") in the Oracle data dictionary. Step 204 SELECTs the COLUMN_NAME from the DBA_CONS_COLUMNS table where the CONSTRAINT_NAME is the Primary Constraint Name identified in step 202. Thus, the steps 202 and 204 operate to identify the primary key constraint column for each database table as those steps are repeated each time through the loop 200.

Similarly steps 206 and 208 operate to identify the referential integrity constraints for each table as each of those steps are repeated each time through the loop 200. Specifically, step 206 SELECTs the CONSTRAINT_NAME from the DBA_CONSTRAINTS table in the Oracle data dictionary where the CONSTRAINT_TYPE is set to "R" and the TABLENAME='tablename,' while step 208 identifies the particular table column having the referential integrity constraint by SELECTing the COLUMN_NAME from the DBA_CONS_COLUMNS table in the data dictionary where the CONSTRAINT_NAME is equal to the Referential Constraint Name identified in step 206.

Once the primary key constraint column and the referential integrity constraint column have been identified for each table, the internal data structure DataDictionaryInterface is updated at step 210 by attaching the identified constraints to the appropriate columns previously identified (in step 154) and stored within that data structure. After the column constraints have been identified for all of the tables (i.e., once the loop 200 has been completed), step 212 returns the program flow to the main sequence 150 (FIG. 13) at step 158.

Step 158 (FIG. 13) initiates a loop so that the building of the search, edit and design windows (steps 160, 162 and 164, respectively) are repeated for each table determined in step 170 (FIG. 14). As noted above, the building of these graphical windows relies on the information which was dynamically determined in the preceding steps 152, 154 and 156, and which was stored in the internal data structure DataDictionaryInterface.

Figure 17:
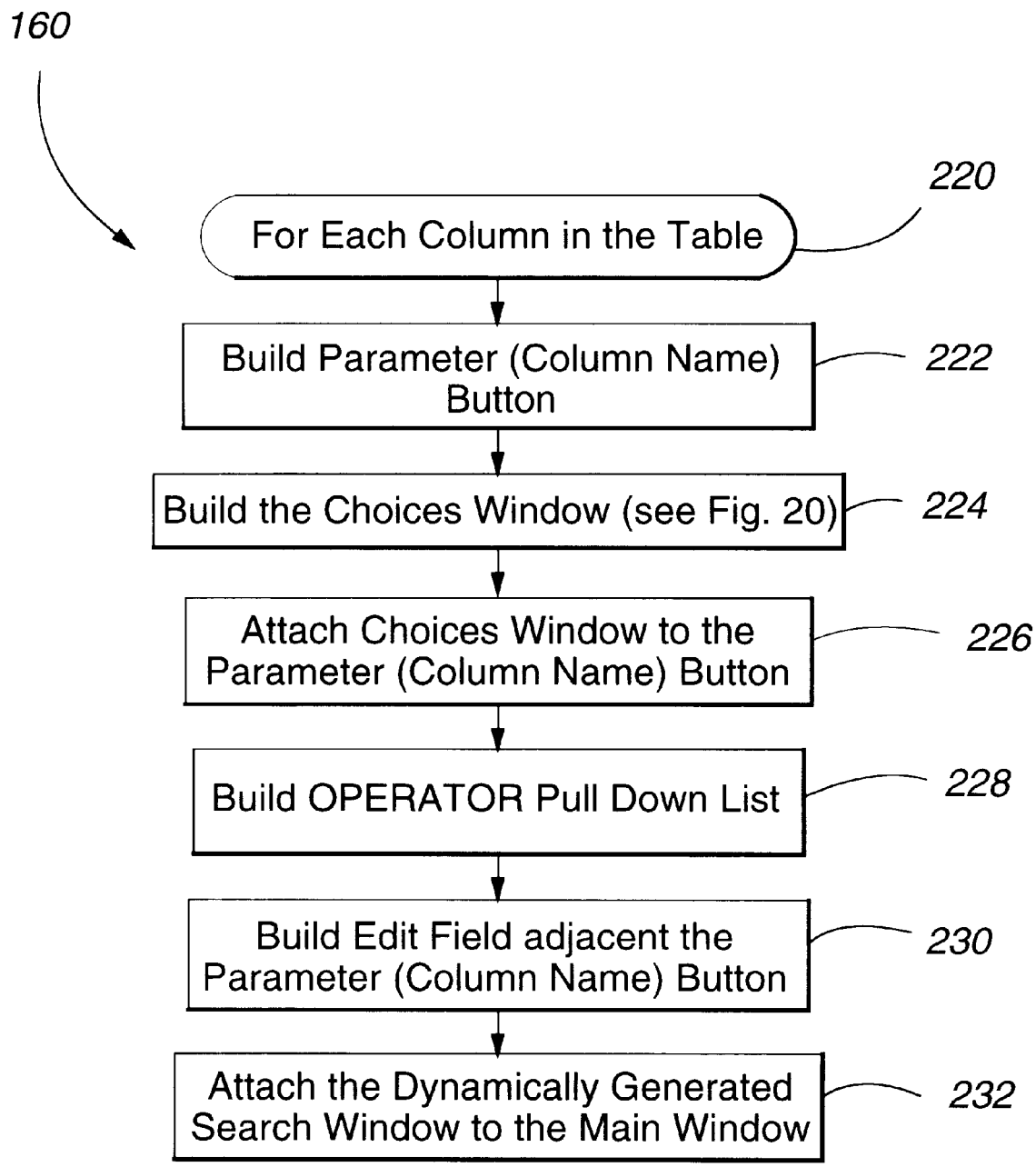
FIG. 17 is a flow diagram illustrating the functions associated with the Build Search Window task shown in FIG. 13.

The step 160 of building the search window 50 (FIG. 4) for each of the database tables is described in further detail in conjunction with the flow diagram of FIG. 17. In the first step 220, a nested loop is initiated so that the steps remaining within FIG. 17 are repeated for each column within the particular table from the loop initiated at step 158 (FIG. 13). Next, the parameter buttons 52, the input fields 53 and the operator pull-down list 54 (FIG. 4) are built to provide a user with the means to specify query information for each column of the table. As noted above, the internal data structure DataDictionaryInterface contains column information for each database table, and that column information is used in the following steps to build the search window 50 (FIG. 4).

In step 222, a graphical button is built with the column name printed in a user-readable form. Taking for example the inventory objects TRAKVU_L5 table 25 shown in FIG. 1, the user-readable "Barcode" parameter button 52 shown in FIG. 4 is preferably built by taking the column name L5_BARCODE from the DataDictionaryInterface internal data structure and stripping the TableID (e.g., the "L5"), removing the underscore, and converting all but the first letter of each word to lower case.

Figure 20:
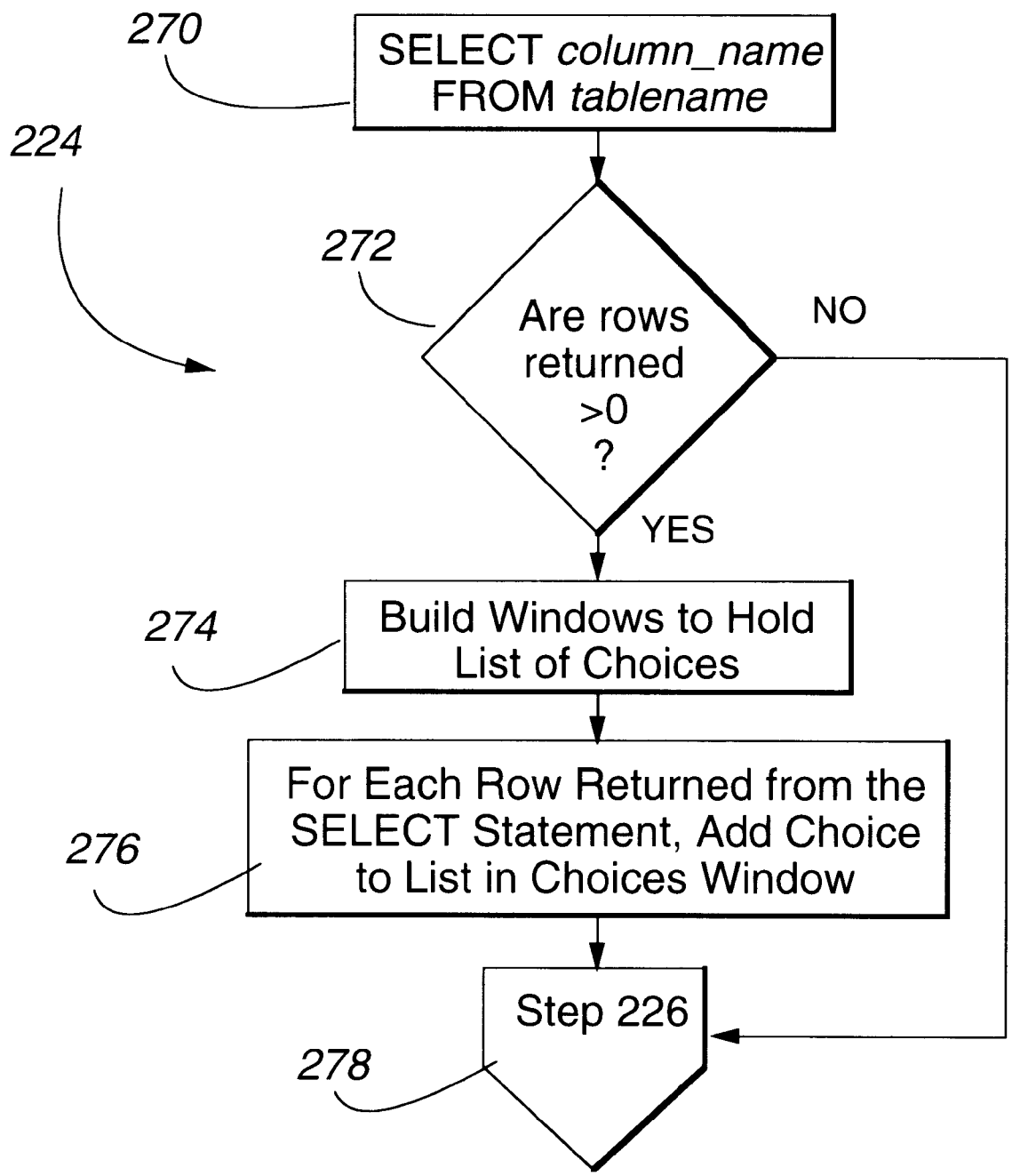
FIG. 20 is a flow diagram illustrating the functions associated with the Build Choices Window task shown in FIGS. 17 and 18.

In step 224, a choices window 60 (FIG. 5) is built for the particular column selected in step 220. FIG. 20 provides further details on the building of a choices window 60. In step 226, the choices window 60 built in step 224 is attached to the parameter (column name) button 52 which was built in step 222. Attaching the choices window 60 to the parameter button 52 in this manner provides a user with the option of pressing on the graphical parameter button 52 to access a list of choices as described above and as shown in FIG. 5. The user can then select from the list of choices so that the selected choice is transferred to the input field 53 (FIG. 4).

Next, an operator pull-down list 54 is built at step 228. The list preferably provides a user with a choice of six logical operators (see FIG. 4) to use in defining the search query. Lastly, in step 230, the user-input fields 53 (FIG. 4) are built adjacent their corresponding parameter (column name) buttons 52. The input fields 53 allow users to specify different search criteria and the fields may contain text, numbers or typical wildcard characters. Once the search window 50 is built at the conclusion of the nested loop 220, the window 50 is attached at step 232 to the "Search" option on the menu bar 46 of the main window 44 (FIG. 3).

Figure 18:
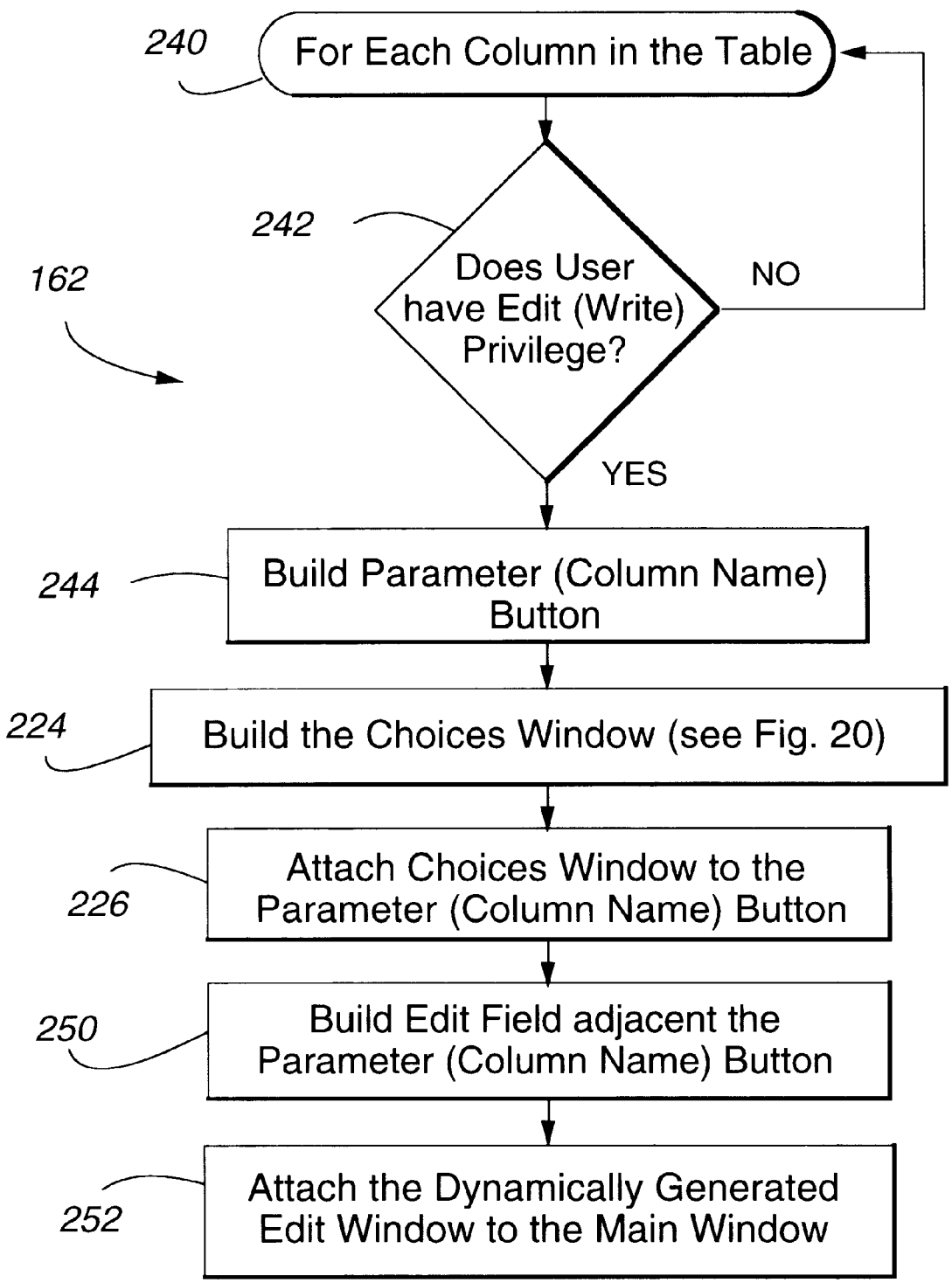
FIG. 18 is a flow diagram illustrating the functions associated with the Build Edit Window task shown in FIG. 13.

The step 162 (FIG. 13) of building the edit window 80 (FIG. 7) for each of the database tables is described in further detail in conjunction with the flow diagram of FIG. 18. The process of building the edit window 80 is similar to that of building the search window 50 described in FIG. 17, with the important exception that a user can only perform edits on those columns of a table which the user is privileged to edit. In other words, if a user does not have sufficient privileges to edit a certain column of a table, the DGUI preferably hides that column (i.e., that parameter button 82) from the user in the edit window 80 (FIG. 7).

In the first step 240 in FIG. 18, a nested loop is initiated to repeat the remaining steps in FIG. 18 for each column within the particular table from the loop initiated at step 158 (FIG. 13). Next, a determination is made at step 242 as to whether the database user has edit (i.e., write) privileges for the specific table column being considered. If the user does not have edit privileges for that table column, the program flow returns to the loop initiated at step 240 to select the next table column. The program flow then returns to step 242 where a determination is made as to whether the user has edit privileges for that subsequent column of the table.

If a positive determination is made at step 242 (i.e., if it is determined that the user may edit that particular parameter or table column), a corresponding parameter button 82 (FIG. 7), choices window 60 (FIG. 5) and input field 83 (FIG. 7) are built in a manner similar to that discussed above (FIG. 17) with respect to the search window 50 (FIG. 4) using the column information from the internal data structure DataDictionaryInterface.

First, in step 244, a graphical button is built with the column name printed in a user-readable form. This step is similar to the step 222 discussed above with respect to FIG. 17. Next, steps 246 and 248 in FIG. 18 are identical to the steps 224 and 226 described in FIG. 17 for building a choices window 60 (FIG. 5) and attaching that choices window 60 to the parameter button built in step 244. The process of building the choices window 60 is further described in conjunction with FIG. 20.

Next, in step 250, the user-input fields 83 (FIG. 7) are built adjacent their corresponding parameter (column name) buttons 82. Once the edit window 80 is built at the conclusion of the nested loop 240, the window 80 is attached at step 252 to the "Edit" option on the menu bar 46 of the main window 44 (FIG. 3).

Figure 19:
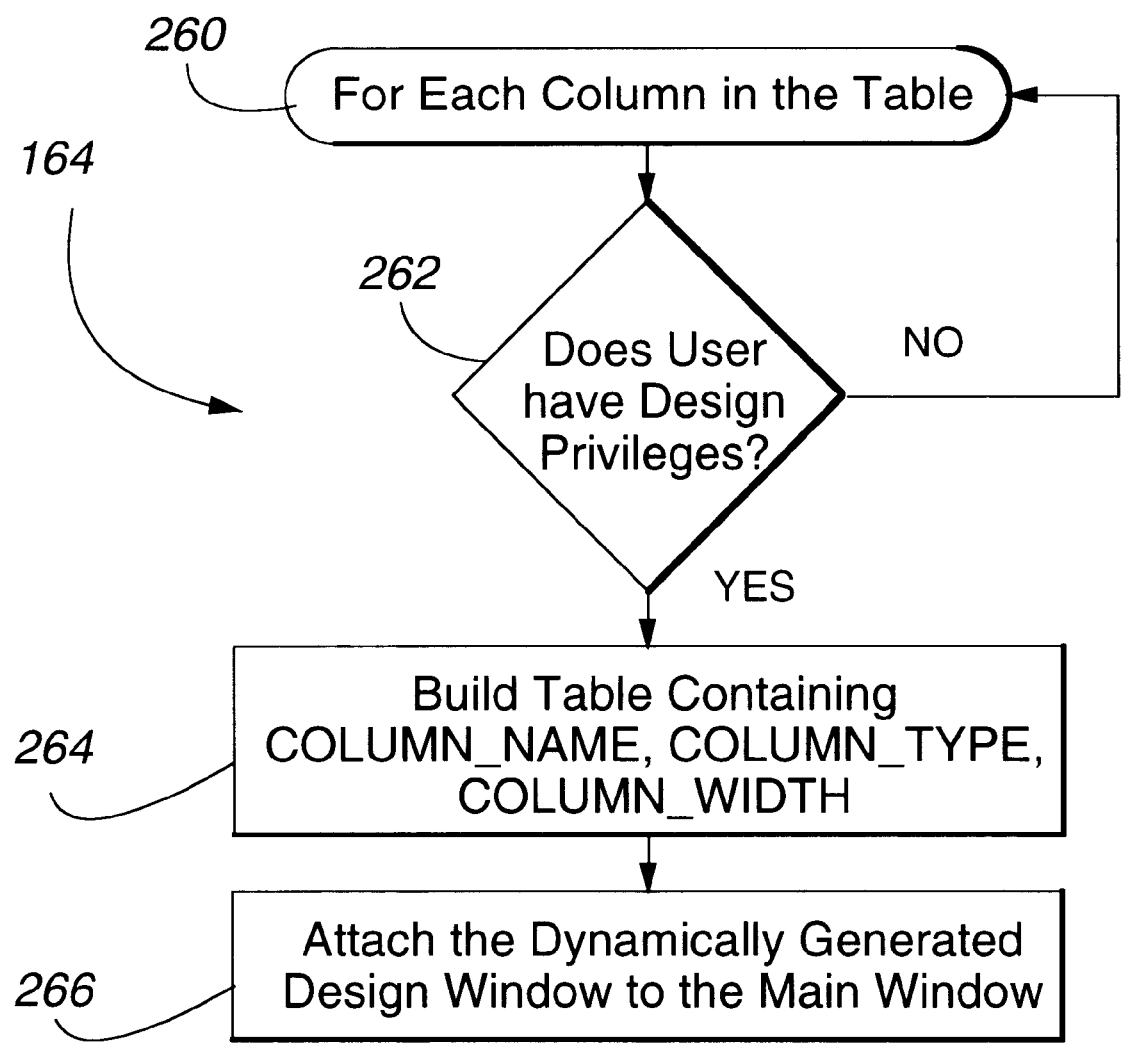
FIG. 19 is a flow diagram illustrating the functions associated with the Build Design Window task shown in FIG. 13.

The step 164 (FIG. 13) of building the design window 90 (FIG. 7) for each of the database tables is described in further detail in conjunction with the flow diagram of FIG. 19. The process of building the design window 90 is similar to that of building the edit window 80, described in FIG. 18, in that only a user having design privileges may modify a table by adding or deleting columns or modifying the attributes of existing columns. Thus, if a user does not have sufficient design privileges for a certain table column (i.e., if the user is not privileged to delete or modify the different attributes of that column), the DGUI preferably does not list the column attributes within the data fields 92 of the design window 90 (FIG. 8).

In the first step 260 in FIG. 19, a nested loop is initiated to repeat the remaining steps in FIG. 19 for each column within the particular table from the loop initiated at step 158 (FIG. 13). Next, a determination is made at step 262 as to whether the database user has design privileges for the specific table column being considered. If the user does not have design privileges for that table column, the program flow returns to the loop initiated at step 260 to select the next table column. The program flow then returns to step 242 for a determination as to whether the user has edit privileges for that subsequent column of the table.

If a positive determination is made at step 262 (i.e., if it is determined that the user may modify the column attributes of that particular table column), the DGUI builds a table at step 264 containing the attributes corresponding to the particular table column selected at step 260. For example, the table built at step 264 preferably includes the COLUMN_NAME, COLUMN_TYPE and the COLUMN_WIDTH which was previously determined and stored within the DataDictionaryInterface data structure.

Finally, when the step 264 of building the table is complete at the conclusion of the nested loop 260, the dynamically generated design window 90 is attached at step 266 to the "Design" option on the menu bar 46 of the main window 44 (FIG. 3).

As noted in FIGS. 17 and 18 above, a choices window 60 (FIG. 5) is built and attached to each parameter button 52 and 82 within the search window 50 and the edit window 80, respectively. The step 224 (FIGS. 17 and 18) for building the choices window 60 for a particular database table column (i.e., within the nested loop 220 in FIG. 17 or the loop 240 in FIG. 18) is described further below in conjunction with FIG. 20.

First, at step 270, the particular column_name (from within the nested loop 220 or 240) is SELECTed from the tablename (determined by the loop 158 in FIG. 13) to return or FETCH the contents (i.e., the rows) of that particular column. Next, a determination is made at step 272 whether the number of rows returned by the SELECT statement in step 270 is greater than zero. If a negative determination is made at step 272 (i.e., the particular column has no rows of content), the program flow jumps to step 278 (FIG. 20) and then returns to step 226 within either FIG. 17 or FIG. 18 where a message is preferably attached to the corresponding parameter buttons (52 and or 82) that no choices window is available for that parameter button.

If a positive determination is made at step 272 (i.e., the particular column does have rows of content), a blank choices window 60 (i.e., a choices window template) is built at step 274 to hold the list of choices. Next, at step 276, a choice is added to the list of choices within the choices window 60 for each row of contents returned by the SELECT statement in step 270. Thus, step 276 essentially forms a further nested loop to add the contents of each row of the SELECTed column (step 270) to the list of choices within the window 60. Once all the choices have been added to the list of choices in the window 60, step 278 returns the program flow to step 226 (in either FIG. 17 or FIG. 18) and attaches the choices window 60 to the corresponding parameter button (52 or 82) within either the search window 50 or the edit window 80, respectively.

Figure 21:
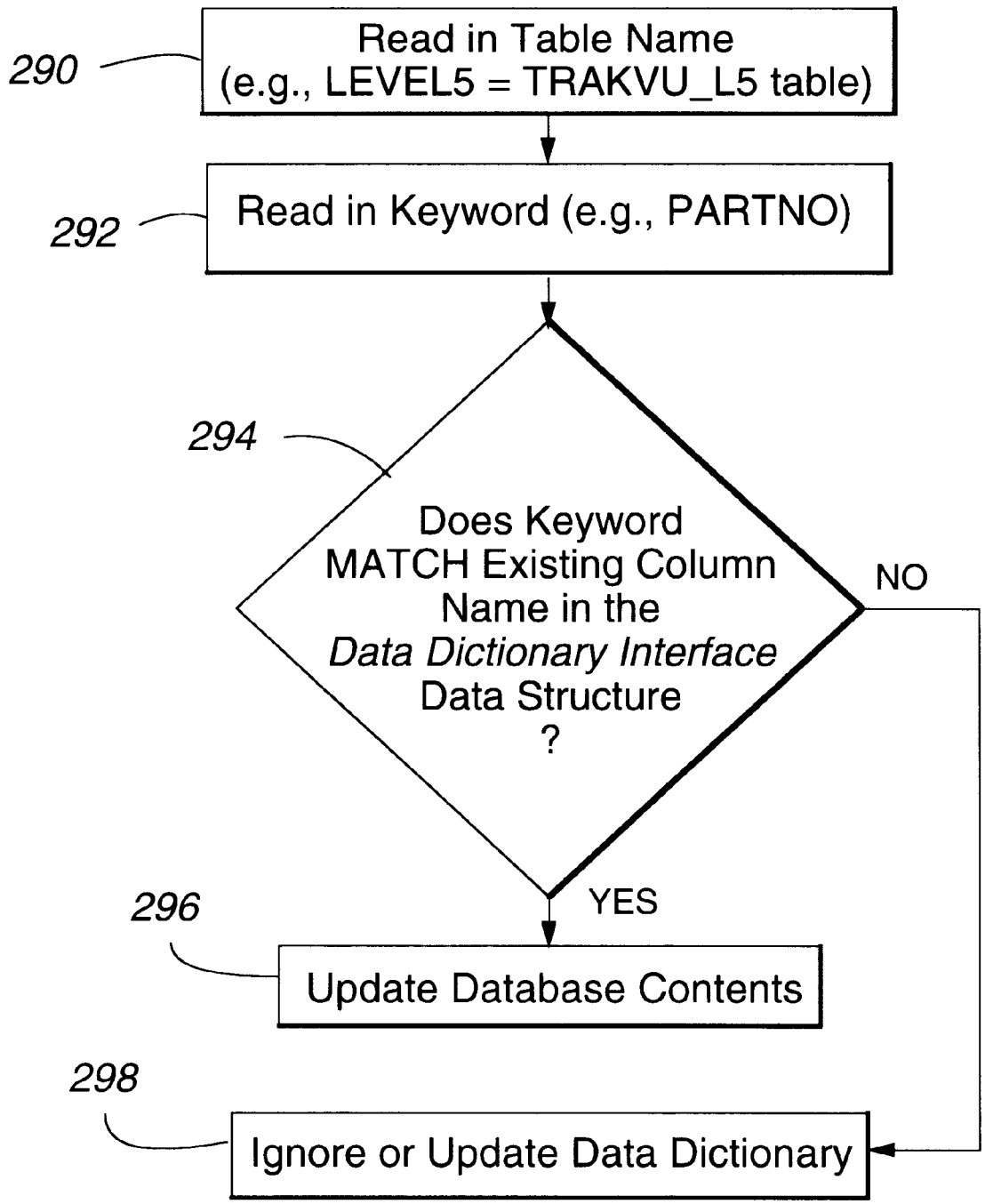
FIG. 21 is a flow diagram illustrating the functions associated with importing data into the relational database via a batch text file.

Lastly, while FIGS. 13–20 illustrate how the DGUI dynamically generates the windows necessary for navigating and editing the contents of the relational database, as well as modifying the data dictionary itself, FIG. 21 illustrates an import capability of the DGUI which allows large batches of data to be input directly into the different database tables. This import function is preferably accessed by the user via the "Database" option in the menu bar 46 of the main menu 44 (FIG. 3). Thus, rather than editing the contents of the relational database 24 one row at a time via the edit window 80, the DGUI of the present invention includes a provision for importing new table contents through a keyword-driven batch text file. Additionally, the batch text file may also be used to add new table columns (i.e., modify the data dictionary) in the manner described below.

A portion of a sample batch text file which may be imported into the relational database 24 by the DGUI is shown below:

LEVEL5
BARCODE='1345'
PARTNO='FE12822'
LOCATION='HAB1_P1_A1'
STATUS='100% Full'
ENDLEVEL5
LEVEL5_CATALOG
PARTNO='FE12822'
DESCRIPTION='Portable Fire Extinguisher'
ENDLEVEL5_CATALOG The above batch text file includes two table entries: one for the "Level 5" table 25 in FIG. 1 and one for the "Level 5 Catalog" table 26. The two table entries describe a portable fire extinguisher which is stored within the habitat module HAB1. The process for reading the batch file into the relational database 24 is described in greater detail below in conjunction with FIG. 21.

The import process shown in FIG. 21 is preferably called from within a loop so that the steps shown in FIG. 21 are followed for each complete entry within the batch text file. An entry is defined as the text between the TABLE_NAME variable (e.g., "LEVEL5") and the ENDTABLE_NAME command (e.g., "ENDLEVEL5").

First, at step 290 (FIG. 21), the DGUI reads in the table name associated with the TABLE_NAME variable which begins each entry. For example, for the variable "Level5", the DGUI reads in the table name TRAKVU_L5. Next, at step 292, the DGUI reads in each line of the entry and parses each line into a keyword (i.e., the column name), an operator (i.e., an equal sign), and the value of the keyword which is preferably surrounded by quotation marks. To improve the readability of the batch text file, the keyword (i.e., column name) preferably does not include the Table ID as a prefix. Rather, the DGUI preferably adds the Table ID automatically during the step 292 since the Table ID is known once the table name is read at step 290.

Next, at step 294, a determination is made as to whether the keyword read at step 292 matches an existing column name stored within the DataDictionaryInterface data structure. If a match is found (i.e., if the keyword matches an existing column within the table), the database contents are updated at step 296. However, if a negative determination is made at step 294 (i.e., the keyword does not match an existing column in the specified table), then the user is preferably given the option at step 298 to either ignore the particular batch file entry or to create a new column for the specified table. If the user opts to create a new column, the DGUI generates a SQL command to make the necessary modifications to the data dictionary.

Thus, the import capability shown in FIG. 21 allows for large database updates to be made at one time without requiring a user to go through the relatively burdensome and time-consuming process of entering each new update through an edit window 80 (FIG. 7). Such batch updates may be used when the relational database is initially opened or when large changes are made to the database (e.g., when a new module is added to the ISS).

The DGUI also preferably includes an export capability for the contents of the relational database 24 to a text file in the batch text format displayed above. This export function is also preferably accessed by the user via the "Database" option in the menu bar 46 of the main menu 44 (FIG. 3).

The export file is preferably generated through the use of a SELECT statement within a nested loop (e.g., "SELECT*FROM tablename") which retrieves the contents of each column for each table. The results of the SELECT statement are then preferably written to a text file in the "COLUMN NAME=value" format described above. Such an export capability provides a means for printing or downloading the current contents of the relational database 24 in a user-readable form.

In summary, the DGUI of the present invention provides significant improvement over prior art graphical user interfaces used with RDBMSs. First, the DGUI of the present invention allows inexperienced and experienced users alike the ability to modify not only the contents of the relational database 24, but also the database structure or data dictionary. Secondly, the DGUI regenerates itself (i.e., its windows and schematic representations) each time a user modifies the data dictionary to account for any changes to the structure of the relational database 24.

This self-modifying ability of the DGUI permits users to continuously modify both the contents and the structure of the relational database 24 without requiring changes to the code of the DGUI. Thus, the DGUI does not suffer down time following a change to the data dictionary as would typically be experienced by prior art, hard-coded graphical user interfaces which require code modifications by an experienced software programmer to account for alterations to the data dictionary of the relational database 24.

Therefore, the DGUI of the present invention provides an ideal solution for maintaining dynamic relational databases such as an inventory management system on board the ISS. However, the benefits of the present invention may be applied to any number of relational database applications which would benefit from the flexibility and ease of use of the DGUI. Additionally, while the above-described topology function of the DGUI is well suited for relational database applications such as inventory management systems which store objects in defined physical locations, the DGUI of the present invention is applicable to any relational or object-oriented database application.

A presently preferred embodiment of the present invention and many of its improvements have been described with a degree of particularity. This description is a preferred example of implementing the invention, and is not necessarily intended to limit the scope of the invention. The scope of the invention is defined by the following claims.

The invention claimed is:

1. A dynamic database interface executed by programmed instructions on a general purpose computer in response to input information; the general purpose computer including a memory in which the programmed instructions are recorded, an input device to supply input information for interaction with the programmed instructions, and a display device for displaying information created by the programmed instructions and the input information; said dynamic database interface operating in conjunction with an underlying relational database having database contents contained within a plurality of tables, said relational database further containing data dictionary information defining individual columns of said tables and relations between said columns, wherein said dynamic database interface comprises:

a graphical user interface defining a plurality of graphical windows for formulating commands to be sent to the relational database and for displaying information in the graphical windows from the relational database, said graphical user interface recognizing a structural change in the underlying relational database by initiating a reference to the data dictionary information and dynamically modifying the information displayed in at least one of the plurality of graphical windows in response to a modification of the data dictionary information resulting from the structural change.

2. A dynamic database interface as defined in claim 1, wherein the graphical user interface regenerates each one of the plurality of graphical windows in response to a modification of the data dictionary information.

3. A dynamic database interface as defined in claim 1, wherein the graphical user interface translates the commands formulated in the graphical windows into a structured query language for processing by the relational database.

4. A dynamic database interface as defined in claim 3, wherein:

the commands formulated in the graphical windows include a search query; and the graphical user interface displays a response to the search query on the display device.

5. A dynamic database interface as defined in claim 4, wherein:

the database contents of the relational database includes a plurality of inventory objects;

at least one of the individual columns defines a physical location for each inventory object;

the response to the search query lists at least one inventory object and its respective physical location; and the plurality of graphical windows includes a topology window to display a schematic representation of the physical location of the at least one inventory object.

6. A dynamic database interface as defined in claim 3, wherein:

the commands formulated in the graphical windows include a command to edit the database contents.

7. A dynamic database interface as defined in claim 6, wherein:

the database contents of the relational database includes a plurality of inventory objects;

at least one of the individual columns defines a physical location for each inventory object;

the plurality of graphical windows includes a topology window to display a schematic representation of the physical locations of each of the inventory objects; and the defined physical location of at least one of the inventory objects may be modified by moving the schematic representation of the physical location of the at least one inventory object to a new location within the topology window.

8. A dynamic database interface as defined in claim 3, wherein:

the commands formulated in the graphical windows include a command to modify the data dictionary information of the relational database.

9. A dynamic database interface as defined in claim 1, wherein:

the plurality of graphical windows includes a search window for searching the contents of the relational database, said search window defining user-input fields corresponding to the individual columns defined within the data dictionary information of the relational database.

10. A dynamic database interface as defined in claim 9, wherein:

the graphical user interface updates the user-input fields each time the data dictionary information is modified to incorporate any changes to the individual columns.

11. A dynamic database interface as defined in claim 10, wherein:

the plurality of graphical windows includes a choices window for each user-input field defined within the search window, each said choices window providing a list of the database contents for the individual column of the relational database corresponding to the user-input field.

12. A dynamic database interface as defined in claim 1, wherein:

the plurality of graphical windows includes an edit window for editing the contents of the relational database, said edit window defining user-input fields corresponding to the individual columns defined within the data dictionary information of the relational database.

13. A dynamic database interface as defined in claim 12, wherein:

the graphical user interface updates the user-input fields each time the data dictionary information is modified to incorporate any changes to the individual columns.

14. A dynamic database interface as defined in claim 13, wherein:

the plurality of graphical windows includes a choices window for each user-input field defined within the edit window, each said choices window providing a list of the database contents for the individual column of the relational database corresponding to the user-input field.

15. A dynamic database interface as defined in claim 1, wherein the plurality of graphical windows includes a design window for modifying the data dictionary information of the relational database, said design window:

displaying the individual columns defined within the data dictionary information for a predetermined one of the tables of the relational database;

allowing at least one of the individual columns displayed within the design window to be deleted from the data dictionary information; and allowing at least one new column to be added to the data dictionary information for the predetermined one of the tables.

16. A dynamic database interface as defined in claim 15, wherein:

the design window further allows the individual columns displayed within the design window to be modified.

17. A dynamic database interface as defined in claim 15, wherein:

the graphical user interface updates the individual columns displayed within the design window each time the data dictionary information is modified to incorporate any changes to the individual columns.

18. A dynamic database interface as defined in claim 1, wherein:

the database contents of the relational database includes a plurality of inventory objects; and at least one of the individual columns defines a physical location for each inventory object.

19. A dynamic database interface as defined in claim 18, wherein the plurality of graphical windows includes a topology window to display a schematic representation of the physical location of each of the inventory objects.

20. A dynamic database interface as defined in claim 1, further comprising:

means for importing a batch of data into the relational database to edit the database contents.

21. A dynamic database interface as defined in claim 20, further comprising:

means for importing a batch of data into the relational database to modify the data dictionary information.

22. A dynamic database interface as defined in claim 1, wherein the data dictionary information contains database contents of the underlying relational database, and further comprising:

means for exporting the database contents of the relational database to a text file.

23. A dynamic database interface as defined in claim 1 wherein the data dictionary information is stored in a location of the memory, and the graphical user interface accesses the memory location where the data dictionary information is stored.

24. A dynamic database interface as defined in claim 1 wherein the graphical user interface initiates a reference to the data dictionary information prior to each new display of information in the graphical windows.

25. A dynamic database interface as defined in claim 1 wherein the graphical user interface periodically self-initiates a reference to the data dictionary information to recognize changes in the underlying relational database.

26. A dynamic database interface as defined in claim 1 wherein the graphical user interface recognizes changes in the underlying relational database and self modifies the information displayed in response to changes to the data dictionary information occurring during use of said dynamic database interface.

* * * * *